(12) United States Patent
Starita

(10) Patent No.: US 7,001,171 B2
(45) Date of Patent: Feb. 21, 2006

(54) APPARATUS AND METHODS FOR MANAGING MOLDS AND FORMING TRANSVERSE CORRUGATIONS AND OTHER SHAPES IN EXTRUDED TUBULAR POLYMER MELT PARISONS

(76) Inventor: Joseph M. Starita, 1180 W. 5th St., Marysville, OH (US) 43040

( * ) Notice: Subject to any disclaimer, the term of this patent is extended or adjusted under 35 U.S.C. 154(b) by 589 days.

(21) Appl. No.: 09/788,916

(22) Filed: Feb. 19, 2001

(65) Prior Publication Data

US 2002/0113339 A1 Aug. 22, 2002

(51) Int. Cl.
*B29C 53/22* (2006.01)

(52) U.S. Cl. ............... 425/326.1; 425/336; 425/369; 425/396; 425/451

(58) Field of Classification Search .......... 425/335, 425/336, 369, 396, 392, 442, 451, 326.1
See application file for complete search history.

(56) References Cited

U.S. PATENT DOCUMENTS

| | | | | |
|---|---|---|---|---|
| 4,365,948 A | * | 12/1982 | Chaplain | 425/336 |
| 4,787,598 A | * | 11/1988 | Rahn et al. | 425/335 |
| 5,372,774 A | * | 12/1994 | Lupke | 425/396 |
| 5,510,071 A | * | 4/1996 | Van Wonderen et al. | 425/396 |
| 5,522,718 A | * | 6/1996 | Dietrich | 425/336 |
| 5,560,941 A | * | 10/1996 | Hegler et al. | 425/186 |
| 5,693,347 A | * | 12/1997 | Hegler | 425/233 |
| 5,773,044 A | * | 6/1998 | Dietrich et al. | 425/370 |

* cited by examiner

*Primary Examiner*—Benjamin L. Utech
*Assistant Examiner*—Thu Khanh T. Nguyen
(74) *Attorney, Agent, or Firm*—Dinsmore & Shohl, LLP

(57) ABSTRACT

A corrugator and mold management apparatus and methods for continuously forming transverse corrugations and other shapes in a tubular polymer melt parison formed by an extrusion die employs a plurality of molds that interlock when mated. Each mold has common outside dimensions and a pair of open linear bearings that provide the mold axis and maintain alignment of the molds parallel to and in the same horizontal plane as the axis of the extrusion die. The molds are moved axially along supported rails by bi-directional linear actuating modules and between the pairs of supported rails by lateral transport units. Inner supported rails define the mold tunnel and outer supported rails provide an outer path to move molds upstream back toward the extrusion die. The lateral transport units include extensible rails that facilitate the transfer of molds to and from the mold tunnel and the outer return paths. Delivery units remove from and introduce molds from a plurality of parking stations. The apparatus also has the capability of identifying, locating and tracking molds by continually scanning molds as they are transported or on demand. Automated "on the fly" mold changes automatically introduce molds to and remove molds from the corrugator from and to parking stations simultaneously without interrupting the normal operation of the apparatus and the molds may be rapidly purged and loaded.

40 Claims, 22 Drawing Sheets

APPARATUS AND METHODS FOR MANAGING MOLDS AND FORMING TRANSVERSE CORRUGATIONS AND OTHER SHAPES IN EXTRUDED TUBULAR POLYMER MELT PARISONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

None.

BACKGROUND OF THE INVENTION

The present invention relates to apparatus and methods for forming single wall or dual wall plastic pipe and corrugations and other shapes therein, particularly apparatus and methods for forming transverse corrugations and end shapes on a tubular polymer melt parison formed by an extrusion die. Large diameter single wall or dual wall corrugated plastic pipe so formed is generally used in drainage and sanitary sewer applications. Mold management systems and methods for managing molds in the extrusion process are disclosed.

Typical apparatus for producing corrugated thermoplastic pipe utilizes mold halves that are transferred laterally toward an extrusion die, forming two lines of adjacent and mating mold halves. These two lines of adjacent mating mold halves are transported in a circulating path connected or unconnected to form a continuous moving mold tunnel. At the downstream end of the mold tunnel, mating mold halves are separated and transferred laterally away from the mold tunnel a distance sufficiently large to clear an axial return path upstream (toward the extrusion die) where the pair of molds are laterally transferred again toward each other and the extrusion die where the molds are mated to continually repeat the cycle. In the production of a pipe section, end shapes such a bell or spigot at opposite ends define a predetermined pipe section length.

In the prior art, apparatus are described for producing corrugated thermoplastic pipe by utilizing a plurality of separated mold halves that are transferred laterally toward the extrusion die until the pair of mold halves mate so that the axis of the pair of mold halves is collinear with the axis of the extrusion die. The mated pair of mold halves is subsequently transferred axially downstream from the extrusion die forming two lines of adjacent mating mold halves. These two lines of adjacent mating mold halves are circulated in a path connected or unconnected to form a continuous moving mold tunnel. The speed of the mold halves in the mold tunnel matches the extrusion rate of the tubular polymer melt parison. The pairs of mold halves are laterally transferred from the downstream end of the mold tunnel a distance sufficient to clear a return path to the extrusion die end of the mold tunnel where the pair of molds are laterally transferred again toward each other and the extrusion die to continually repeat the cycle. Horst Rahn in U.S. Pat. No. 4,787,598 describes a corrugating apparatus that laterally transports the mold halves to form a return line by utilizing conveyors to drag the mold bases horizontally around on the bottoms of mold halves. Horst Rahn achieves the circulation of mold halves utilizing a conveyance means to place the mold halves in position to be circulated through the mold tunnel and returned from the end of the mold tunnel to the extrusion die head. This invention has the disadvantage of having to pause the operation of the corrugating apparatus to allow for a time-consuming sequential introduction and removal of mold bases by external means from the corrugating apparatus.

Ralph-Peter Hegler in U.S. Pat. No. 5,693,347 discloses an apparatus that achieves the circulation of mold halves utilizing a pick and place mechanism to place the mold halves in position to be circulated through the mold tunnel and returned from the end of the mold tunnel to the extrusion head. Hegler's apparatus has the capability of sequentially removing a pair of mold halves from the circulating cycle of the corrugating apparatus and placing it on a parking station and introducing another pair of mold halves by transporting them from another parking station. Hegler's mechanism has an advantage over Horst Rahn's by reducing the friction caused by dragging molds by lifting the mold halves off the base during the lateral transfer and the return of the mold halves. However, Hegler has the disadvantage of having a single pick and place mechanism that sequentially transports a mold half to a parking station inline with other parking stations thereby blocking the path of all other mold halves in parking stations. This results in a further disadvantage associated with the corrugating apparatus having to pause to allow the mold half placed in the initial parking station to be removed by an external means. (1) The axial speed of the pick and place mechanism, (2) how far the pick and place mechanism must travel beyond the mold half tunnel to reach the desired parking stations, and (3) the time needed to remove the mold half from the corrugating apparatus by an external means limit the number of accessible mold halves.

In the prior art mentioned above, the movement of the mold halves through the mold tunnel is accomplished by driving a mating pair of mold halves at the beginning of the mold tunnel that push the group of adjacent mating pairs of mold halves downstream through the mold tunnel. This method of moving the mold halves through the mold tunnel has the inherent disadvantage in that the corrugating apparatus can not remove all mold halves between production runs for maintenance of the mold halves, die or corrugator apparatus. The mold halves downstream from the driven mold halves in the mold tunnel are typically removed from the corrugating apparatus by a difficult and time-consuming manual procedure that can be a hazard due to the very large size and weight of the mold halves.

Presently, manufacturers of large diameter corrugated single and dual wall plastic pipe are burdened with the problem of long setup times associated with changing over the production setup of a corrugating apparatus from one pipe size to another. It is common for this process to require a minimum of 4 to 8 hours for two or three persons with the proper equipment to change from producing pipe of one size and shape to another. The industry associated with manufacturing dual wall corrugated plastic pipe now decides how long to make a production run based on the anticipated down time required to make the change over to another product and the cost of carrying additional inventory.

BRIEF SUMMARY OF THE INVENTION

The present invention relates to an enhanced corrugating apparatus having the capability to introduce and remove from the circulating path, mold halves with different centerlines, sizes, shapes and configurations without interrupting or disturbing the production cycle and to provide a rapid and automated means of introducing and removing all mold halves during a transition from one corrugated pipe product to another.

It is an object of this invention to provide apparatus and methods for forming corrugations on a tubular polymer melt parison as it exits from an extrusion die having the enhanced capability to:

1. automatically exchange mold halves with the same or different centerlines, sizes, shapes and configurations without any interruption of the production cycle whereby each mold half is mounted in a mold base having a pair of open linear bearings with a common location with respect to the axis of the tubular internal surface of the mold halves and parallel to said axis, the mold bases to be simultaneously introduced to and removed from the circulating path of the corrugating apparatus at (four) separate and distinct stations;
2. rapidly and automatically exchange all mold bases during setup of the corrugating apparatus by simultaneously removing all mold bases from the circulating path of the corrugating apparatus and introducing different mold bases to the circulating path of the corrugating apparatus at (four) separate and distinct stations;
3. automatically purge the circulating path of the corrugating apparatus of all mold bases and to transfer each mold base to a mold base carrier located at a parking station for maintenance of the extrusion die, the corrugator itself and the mold bases;
4. automatically introduce a complete set of mold bases to the circulating path of the corrugating apparatus by transferring mold bases from mold base carriers located at parking stations for the purpose of setting up the corrugating apparatus; and
5. utilize a low friction, energy efficient and precise means of transporting mold bases to, from and through the entire circulating path of the corrugating apparatus.
6. utilize the mold base carriers for storage, maintenance and transporting mold bases between (a) parking stations of the corrugator apparatus and locations for mold base storage and (b) one production site and another.

It is a further object of the invention to provide apparatus and methods having the capability to identify the mold bases and to establish and track their locations during the operation of the corrugating apparatus.

The invention provides manufacturers of corrugated plastic pipe the benefits providing the capability of:

1. on-demand mold base changes so that mold bases having bell and spigot or other coupling features can be introduced and removed on demand allowing for the possibility of producing consecutive corrugated pipes with varying lengths without disrupting production continuity; and
2. unmanned rapid and automated setups of a corrugating apparatus resulting in reductions of finish goods inventory, manpower and operational power requirements.

The invention is described more fully in the following description of the preferred embodiment considered in view of the drawings in which:

DETAILED DESCRIPTION OF THE INVENTION

Figure 1:
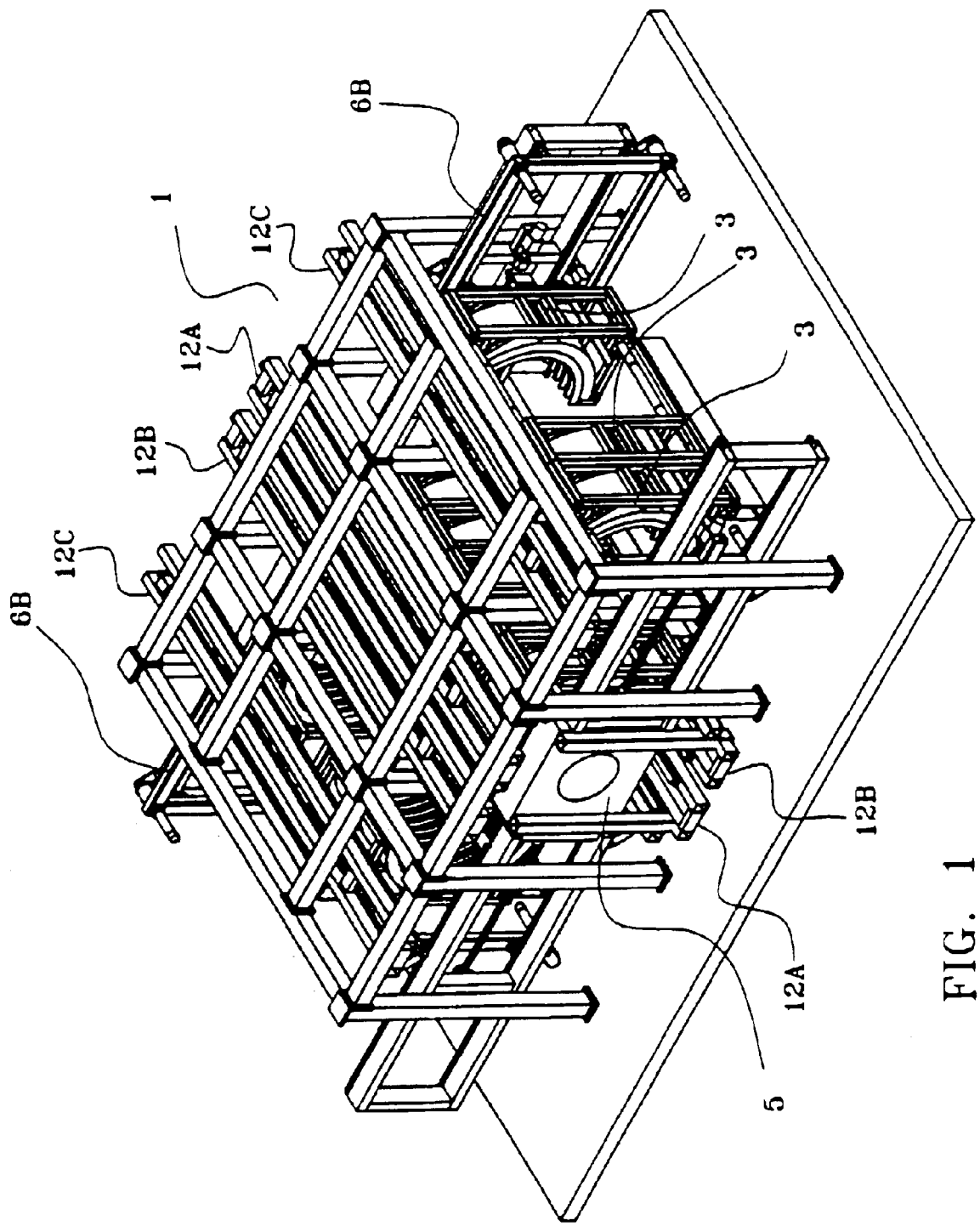
FIG. 1 is a perspective view of the corrugator apparatus with mold bases.

The invention provides an enhanced corrugator apparatus and methods for continuously forming transverse corrugations in a tubular polymer melt parison formed by an extrusion die. A plurality of mold halves are mounted in mold bases to form corrugation or bell or spigot or other forms of mold sections that laterally interlock around the periphery of a polymer melt parison when mated. In the specification and claims herein, the moveable assembly including the actual mold sections that form the shape in the parison may sometimes be referred to as a "mold." While corrugations are the principal shapes formed in the lengths of pipe sections, it is recognized that pipe sections of predetermined length include formed end segments that may, for example, be bell or spigot or other shapes employed to enable joints between discrete and adjacent pipe sections. Thus, reference to a corrugation also includes reference to an end shape for a pipe section, as molds are circulated to form shapes in the apparatus and method.

Each mold section has common outside dimensions and a pair of open linear bearings that provide that the axis of the molds, regardless of their size or shape remains parallel to and in the same horizontal plane as the axis of the extrusion die. The molds are moved axially along inner and outer pairs of supported rails by bi-directional linear actuating modules, and between the pairs of supported rails, by lateral transport units. Two inner pairs of supported rails define the mold tunnel and two outer pairs of supported rails provide an outer path to move molds upstream toward the extrusion die. Preferably, the lateral transport units have two pair of contracting and expanding protruding rails that facilitate mold transfer to and from the inner tunnel path and the outer return paths. Two mold base delivery units automatically remove from and introduce to the corrugating apparatus molds from a plurality of parking stations for the molds.

The corrugator apparatus and the delivery units have the capability of identifying, locating and tracking all mold bases by continually identifying by scanning bar codes on the molds or using wireless or other identification indicia, as they are transported and/or by scanning or locationally positioning molds on demand. The unit provides for "on the fly" mold changes whereby molds are automatically introduced to and removed from the corrugator apparatus by means of mold parking stations simultaneously without interrupting the normal operation of the corrugator apparatus. Molds can be rapidly purged by automated removal of the molds from the corrugator apparatus or rapidly loaded by comparable automated means.

In the preferred embodiment, separate mold bases of a uniform size are used with different sized molds to form pipes of different size diameters. In this manner the same apparatus is adaptable to the production of different diameter pipes by changing molds, which, as described herein, can be conveniently and economically done "on the fly" in accordance with the invention.

Figure 2:
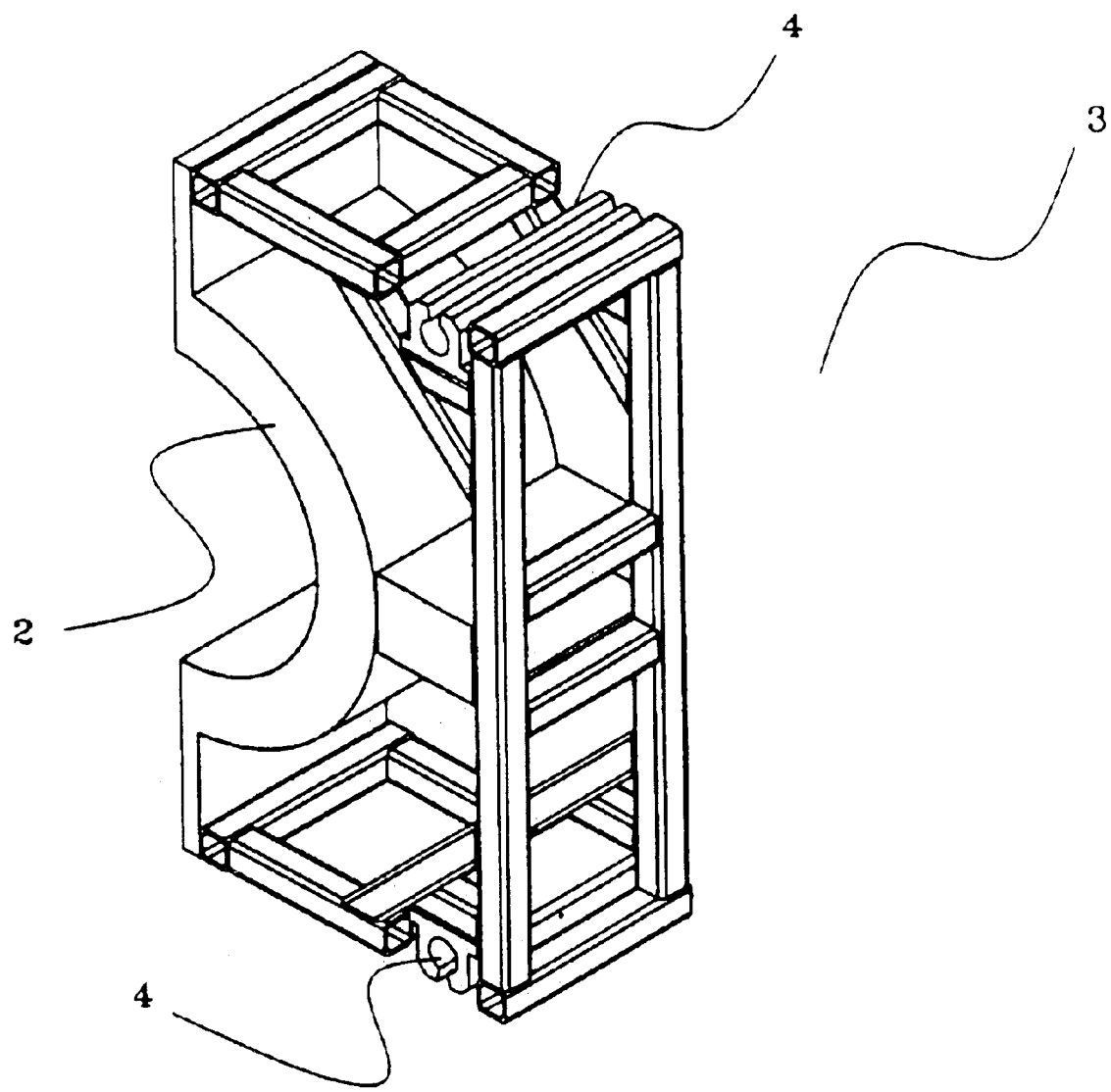
FIG. 2 shows the mold base with integral open linear bearings and mold half.

FIG. 1 shows an enhanced large diameter pipe manufacturing apparatus 1 that utilizes a method for continuously forming transverse corrugations and other shapes in a tubular polymer melt parison formed by an extrusion die. A plurality of mold sections, mold halves 2 shown in FIG. 2 in an example for 48.0 inch diameter pipe, are mounted in mold bases. FIG. 1 shows an example of a mold for a 72.0 inch diameter pipe. Each mold base 3 has common outside dimensions, a pair of open linear bearings 4 passing through the full depth of the mold base 3 and a common location with respect to the axis of the tubular internal surface of the mold half, parallel to the axis. Regardless of the shape and size of the different pairs of mold halves, the mold base by means of its integral open linear bearings supplies a common means to support and transport each mold through a series of sequential lateral and axial movements wherein the axes of the mold bases remain parallel to and in the same horizontal plane as the axis of the extrusion die. The mating pairs of mold bases have an integral interlocking feature so that the each mated pair move as one whenever the mating surfaces of the mold halves are in contact. The preferred interlocking means is a simple combination of a pair of dowels and bushings, however, there are many other well known methods that would function just as well, for example a combination of protruding and recessed surfaces, linear bearings and bushings, keyways and others.

Figure 3:
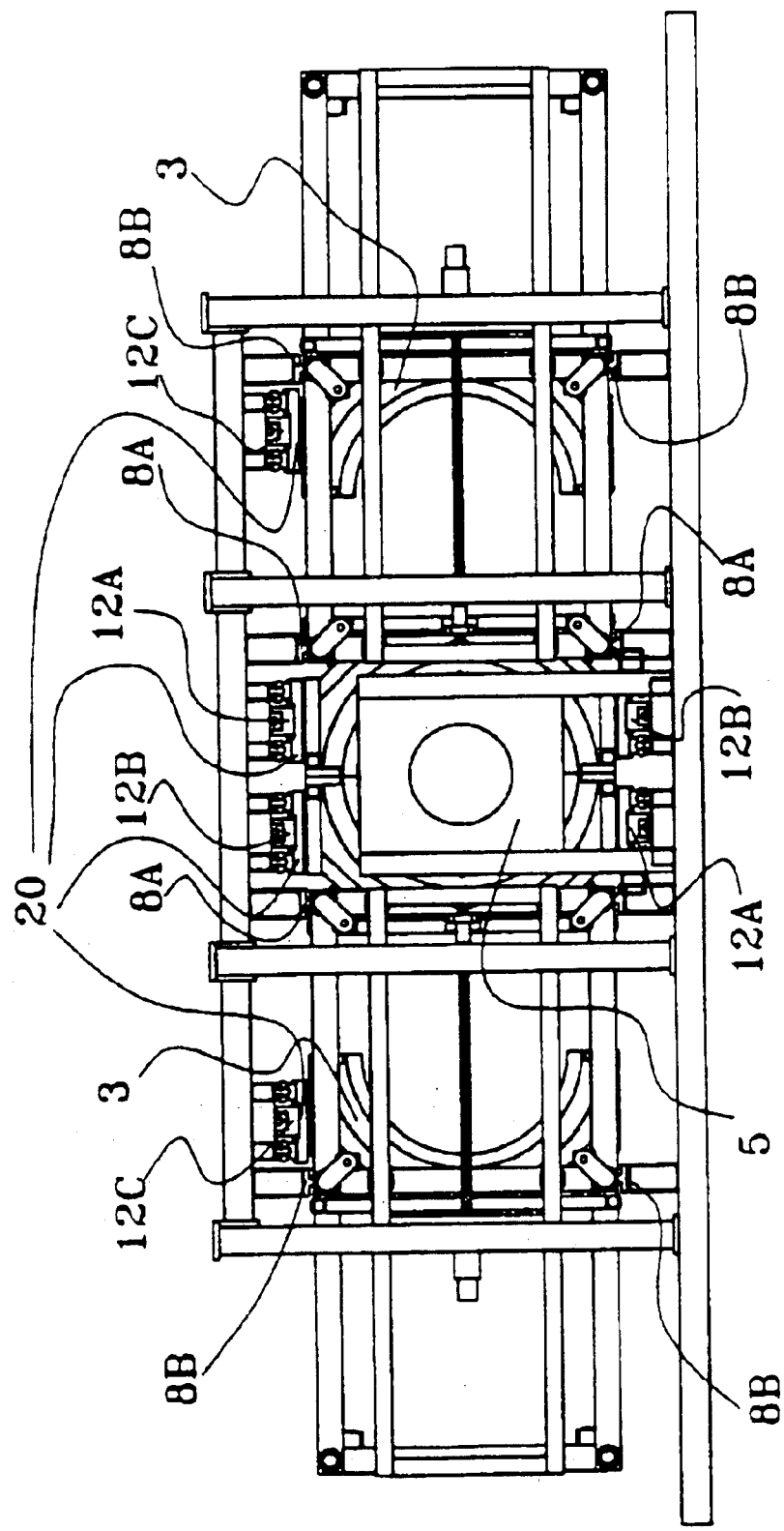
FIG. 3 is a frontal view of the corrugator apparatus.
Figure 4:
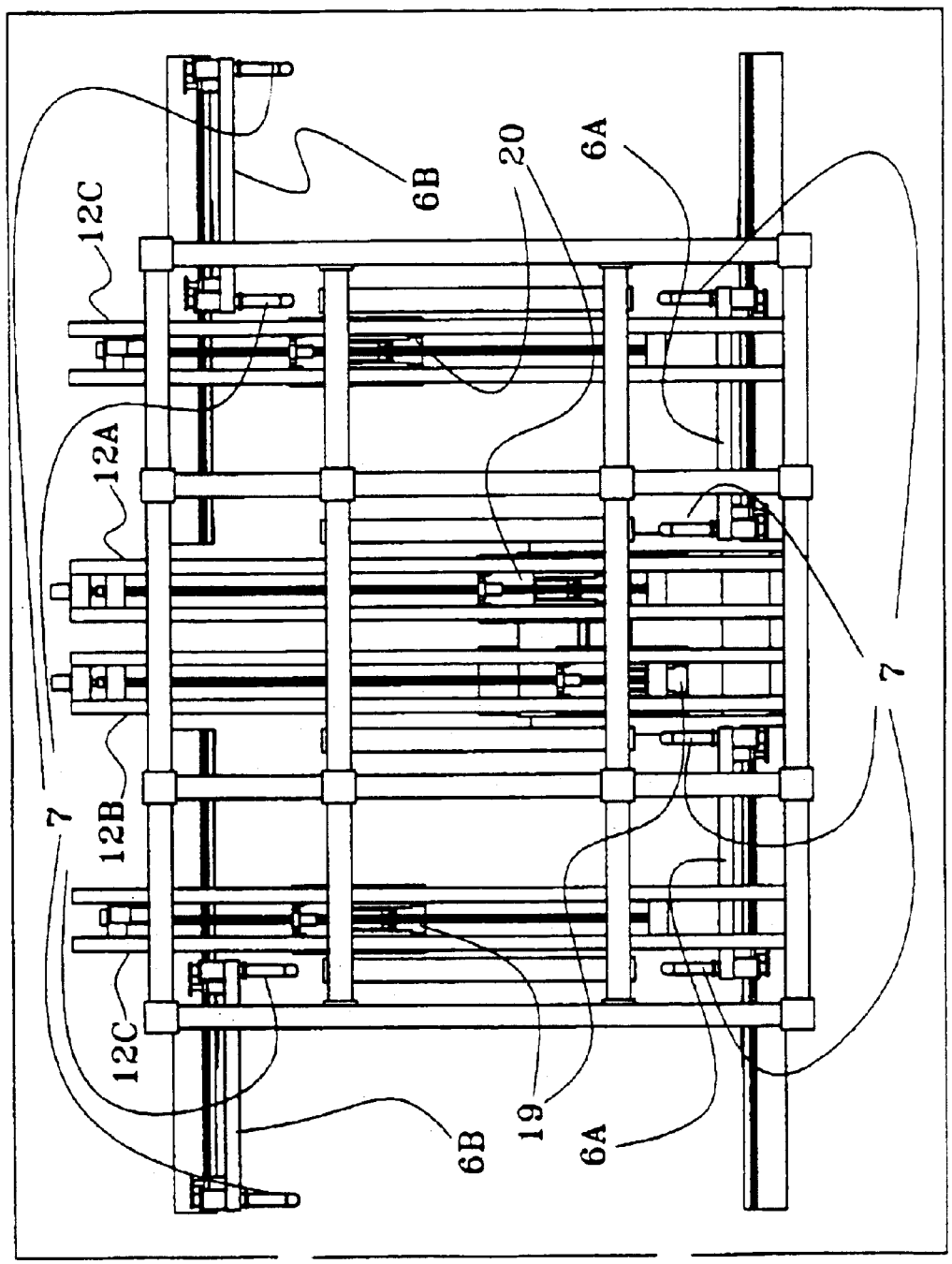
FIG. 4 is a plan view of the corrugator apparatus.

In the system and method of the invention, two laterally separated mold bases 3 shown in FIG. 3, one on each side of the axis of the extrusion die, are transported laterally toward each other and meet at the axis of the extrusion die 5. This lateral transport of the mold bases is accomplished by a pair of lateral transport units 6A and 6B shown in FIG. 1 (6B only) and FIG. 4 wherein each lateral transport unit has a pair of protruding rails 7 shown in FIG. 4 that penetrate the open linear bearings of a mold base a distance slightly larger than half mold base depth. The penetration of the protruding rails 7 provide a cantilevered support to the mold base wherein the unsupported end of the mold base faces downstream of the extrusion die. The two lateral transport units 6A shown in FIG. 4 are located so that the supported ends of the mold bases are upstream of the outer wall die orifice a distance slightly longer than the depth of the mold base. After the two lateral transport units close a pair of mold bases around the extrusion die; the mated pair of mold bases is transferred axially downstream on to two pair of supported rails 8A shown in FIG. 3. The two pairs of supported rails 8A are located so that axes of the mold bases moving along the supported rails remain collinear with the axis of the extrusion die. The length of the two pairs of supported rails 8A has a value matching the axial length of the adjacent mold bases resident in the mold base tunnel formed by the two pair of supported rails. The two pairs of supported rails, on which the four adjacent, interlocked and mated pairs of mold bases travel, define the mold base tunnel. The preferred embodiment has four resident pairs of mold bases to insure sufficient residence time for cooling the corrugated melt parison at a mold base tunnel speed of approximately four feet of per minute. Residence time in the mold base tunnel can be increased or decreased independently of the speed by having a mold base tunnel with 2, 3, 4, 5 or more mold bases.

Figure 6:
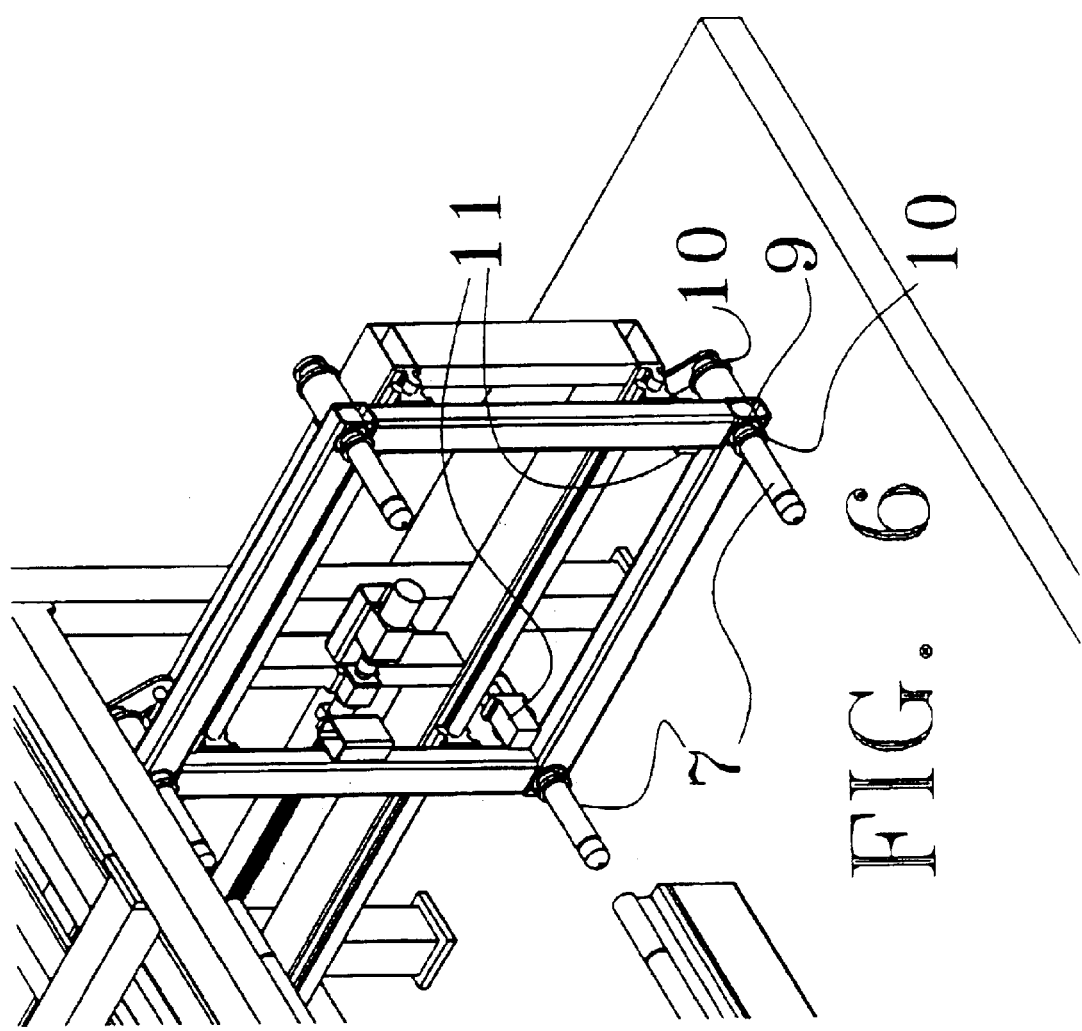
FIG. 6 is a close up perspective view of a lateral transport unit.

The method utilized for handing off a mold base from the pair of protruding rails on a lateral transport unit to a pair of supported rails and the method of handing off a mold base from a pair of supported rails to a pair of protruding rails on a lateral transport unit requires the protruding rails to extend in a constant force manner and contract to a home position. The extension and contraction of each protruding rail from and to a home position is accomplished by:

1. a linear bearing 9 shown in FIG. 6 radially supporting the protruding rail 7;
2. the protruding rail 7 having two radial protrusions 10 that act as axially stops against the ends of the linear bearing 9; and
3. a controlled force linear actuator 11 to move the protruding rail along the axis of the linear bearing that is a pneumatic, hydraulic, spring assisted mechanical or electromagnetic device.

The preferred embodiment shows a pneumatic controlled force actuator 11 shown in FIG. 6. The preferred hand-off method for transferring a mold base away from a lateral transport unit and on to a pair of supported rails requires the protruding rails to extend wherein the radial protrusions on the protruding rail act to push the mold base at a force sufficient to move the mold base toward the pair of supported rails. If the mold base contacts a second mold base that is driven downstream at a controlled speed by a bi-directional linear actuator module, the controlled force actuator acts to accelerate the mold base, to contact the second mold base and move the mold base with the speed of the second mold base. Another bi-directional linear actuator module moves its coupling platform in proximity to said mold base, accelerates the coupling platform to the speed of the driven adjacent second mold base and couples the platform to the mold base. The result is one bi-directional linear actuator driving the mold base and another driving the second mold base whereby the two mold bases remain adjacent and driven in unison at a speed matching the extrusion rate of the melt parison. The preferred method of coupling the platform to the mold base utilizes electromagnets (not depicted in the Figures). An electromagnet is mounted to the moving platform of each bi-directional linear actuator module by a laterally stiff and axially weak flat diaphragm spring. When the electromagnet is activated it moves axially against the axially weak diaphragm spring and contacts a steel plate attached to the mold base. When the electromagnet is shut off the diaphragm spring re-establishes a clearance gap between the electromagnet and the surface of the steel plate.

In a preferred embodiment, the handing off a mold base from the pair of protruding rails on a lateral transport device to a pair of supported rails in the mold base tunnel is made by:

1. the controlled force actuator pushing the mold base until it contacts and moves with the driven second mold base resulting in two adjacent mold bases moving at precisely the same speed and direction;
2. the bi-directional linear actuator module positioning the moving platform in proximity to the mold base;
3. the bi-directional linear actuator module moving the platform with electromagnet at the same speed and direction as the driven mold base;

4. turning on the electromagnet that contacts the steel plate on the mold base thereby coupling the moving platform to the mold base; and
5. the controlled force linear actuator retracting the protruding rails against the other stop on the protruding rail.

This method provides benefits in that the two adjacent mold bases are simultaneously being driven at precisely the same speed and direction in a simple and accurate fashion without the use of sensing devices and synchronized movements.

In order to accomplish the uninterrupted continuous movement at a constant speed of the circulating adjacent mold bases in the mold tunnel requires the capability to continually drive the mold base at the beginning of the tunnel at the speed that matches the extrusion rate of the extrusion of the melt parison. This task is accomplished by having two diagonal pairs of bi-directional linear actuator modules 12A and 12B shown in FIGS. 1, 3, 4 and 5 that alternate between driving the last pair of mold bases to enter the mold base tunnel and the last pair of mold bases to arrive via the two upstream lateral transport units. The two pairs of bi-directional linear actuator modules 12A and 12B are configured wherein one pair diagonally opposes the other. One diagonal pair of bi-directional linear actuator modules 12A couples to and drives the last pair of mold bases to enter the mold base tunnel. The other diagonally opposed pair of bi-directional linear actuator modules 12B accepts the hand off of the "last to arrive" pair of mold bases. When the hand off is just completed both pair of mold bases are adjacent and being driven at the same speed. The downstream diagonal pair of bi-directional linear actuator modules uncouples to begin the hand off process by moving upstream into proximity with the next pair of mold bases to be handed off thereby repeating the alternating cycle. In this way the adjacent pairs of mold bases can be circulated continuously through the mold base tunnel without any deviation in the speed or separation between them.

An alternate embodiment of the coupling device on the moving platform shown here is a cam type that pneumatically activates a tapered key to move downward to engage a keyway on the mold base when a sensor indicates the moving platform is position. This requires the bi-directional linear actuator module to over shoot the engaging position move at a slightly higher speed than the other mold until a sensor indicates the platform is positioned for engagement. At this point the bi-directional linear actuator module must simultaneously decelerate to the speed of the other mold base and engage said mold base to insure the two molds remain adjacent.

When the interlocked and mated pair of mold bases clear the protruding rails on lateral transport units, the pair of lateral transport units separate and move to line up with two outer pairs of supported rails. The two outer pairs of support rails provide part of the mold base circulation path that is referred to as the outer path. There is one outer path on each side of the axis of the extruder displaced a distance large enough to allow mold bases on the outer path and those in the mold base tunnel to pass unencumbered. Each of the two outer paths has associated with it a bi-directional linear actuator module capable of transmitting motion to the any mold base along the outer paths by coupling the mold base to its moving platform.

In the preferred embodiment, handing off a mold base from a pair of supported rails on the outer path to the pair protruding rails on a lateral transport device is made by:
1. the controlled force actuators 11 shown in FIG. 6 on the lateral transport extending the protruding rails until the protruding rail hits its stop;
2. the bi-directional linear actuator module 12A, 12B, 12C shown in FIGS. 1, 3, 4 and 5 positioning the moving coupling platform in proximity to the mold base to be transferred;
3. the bi-directional linear actuator module activates electromagnet coupling the moving platform to the mold base;
4. The bi-directional linear actuator module transfers the mold base along the supported rails of the outer path on to the pair of extended protruding rails; and
5. The controlled force actuator 11 shown in FIG. 6 on the lateral transport unit contracts the protruding rails until the other stop is reached.

To complete the circulation of the mold bases in the corrugating apparatus, a second pair of lateral transfer units 6B shown in FIGS. 1 and 4 is placed at the downstream end of the mold tunnel and outer paths. In other words, there are two pairs of lateral transport units configured symmetrically about the vertical plane bisecting the mold base tunnel.

During a production operation, the corrugating apparatus functions by continuously circulating pairs of mold bases through the mold base tunnel shown schematically in FIGS. 7, 8, 9 and 10. The corrugating apparatus is composed of:
1. two extruders characterized by 221 in FIGS. 7 through 10 and FIGS. 16 through 22;
2. one pair of upstream lateral transport units 6A characterized as 206A;
3. one pair down stream lateral transport units 6B characterized as 206B;
4. one pair of supported rails 8B characterized by 208B that define the outer paths and function to return mold bases to the upstream end of the two outer path;
5. two pairs of supported rails 8A characterized by 208A define the mold base tunnel through which passes an unending series of adjacent interlocked and mated mold bases;
6. each lateral transfer unit has two pair of protruding rails 7 characterized as 207 that contract and extend to facilitate mold base hand offs from pairs of supported rails to the protruding rails on the lateral transfer units and vice versa;
7. bi-directional linear actuator modules 12A, 12B and 12C characterized by 212A, 212B and 212C respectively are associated with the pairs of supported rails. Each linear actuator module has a moving platform 20 characterized as 220A, 220B and 220C having the capability of coupling to and moving any mold base in both directions anywhere along the associated pair of supported rails. The two diagonal pairs of bi-directional linear actuator modules 212A and 212B associated with the mold tunnel synchronously alternate from transferring an interlocked and mated pair of mold bases from a lateral transport unit into the mold tunnel and to driving the adjacent pairs of mold bases through the mold base tunnel. The bi-directional linear actuator modules 12C characterized by 212C associated with the pairs of supported rails that define the outer paths have moving platforms that can couple with, move in either direction and place any mold base anywhere along the outer path as well as transfer mold bases on and off both the down stream and up stream lateral transport units.

Figure 7:
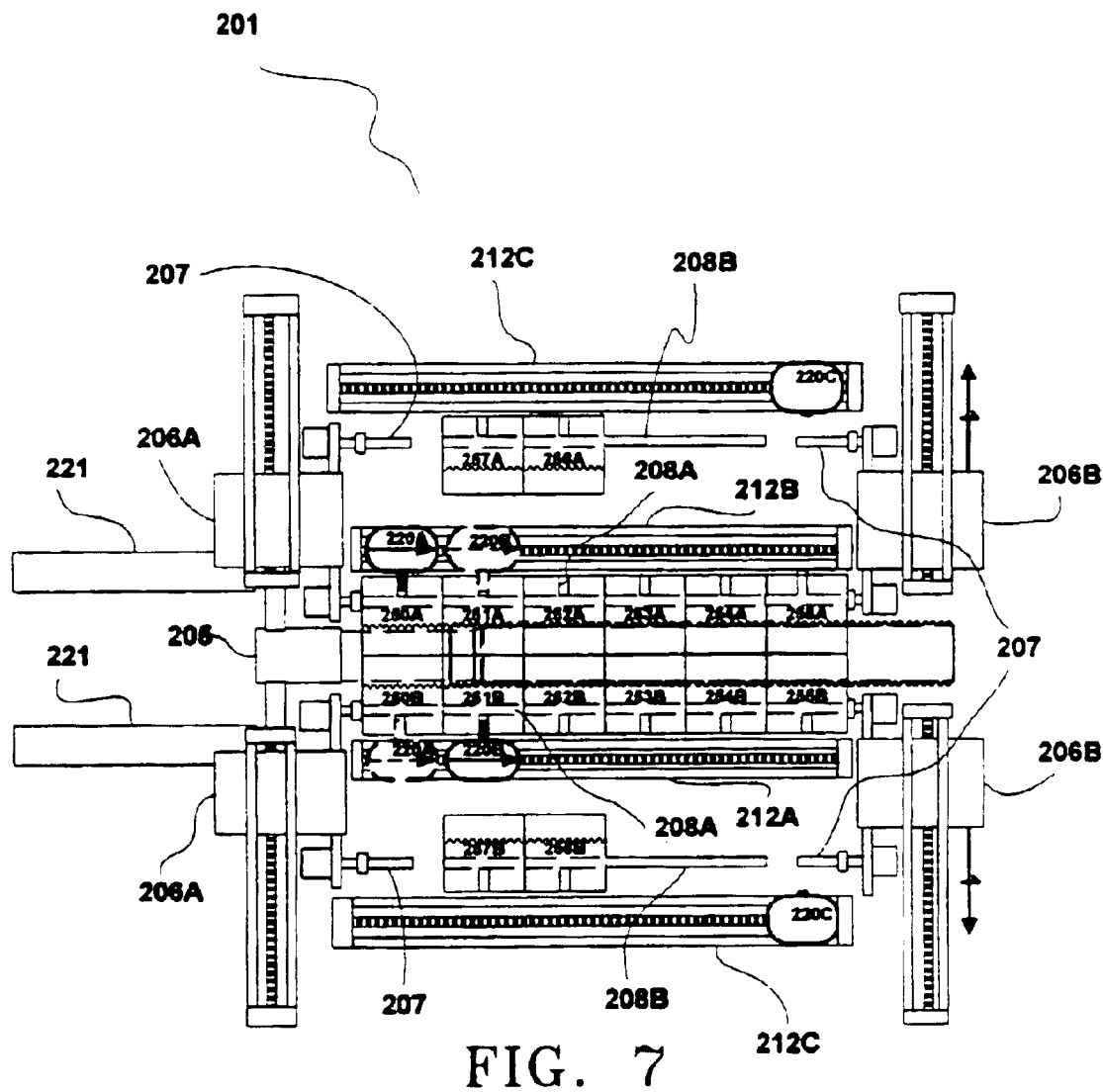
FIGS. 7 through 10 are sketches showing the motion and method of the corrugator apparatus in a chronological sequence.
Figure 8:
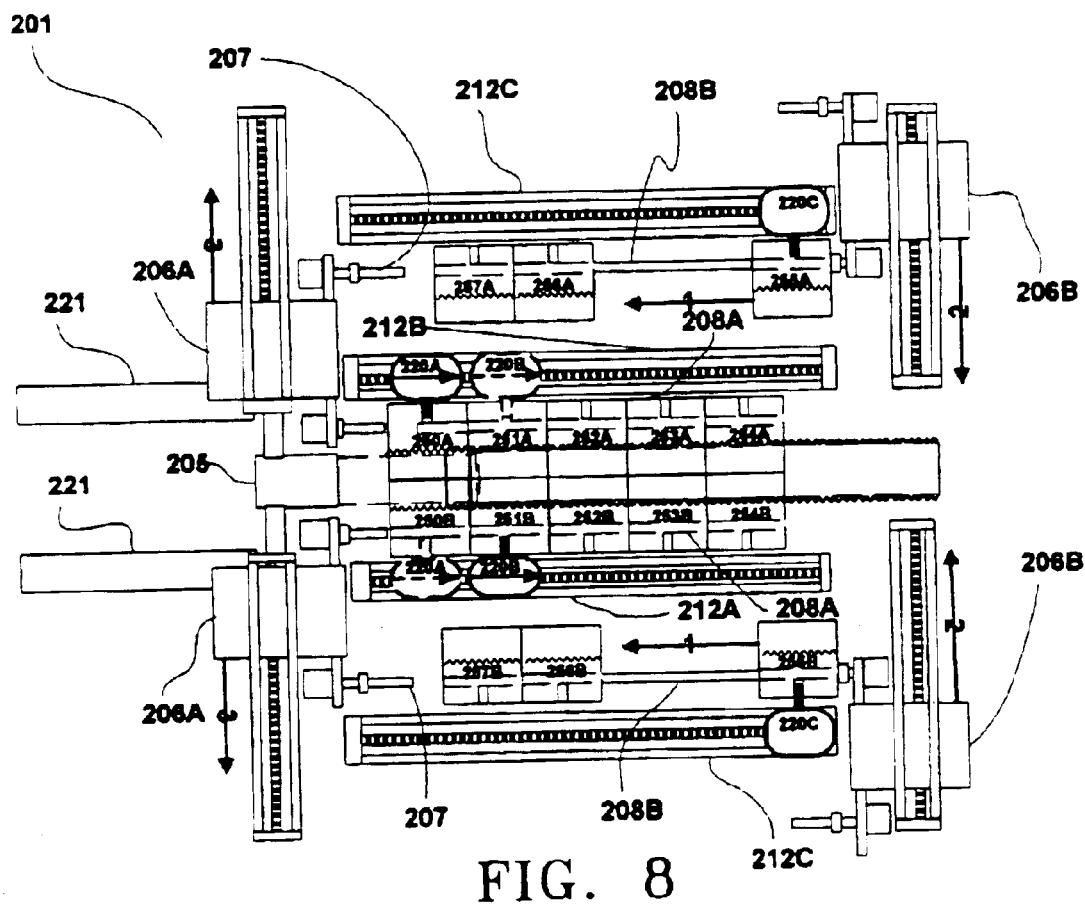
Figure 9:
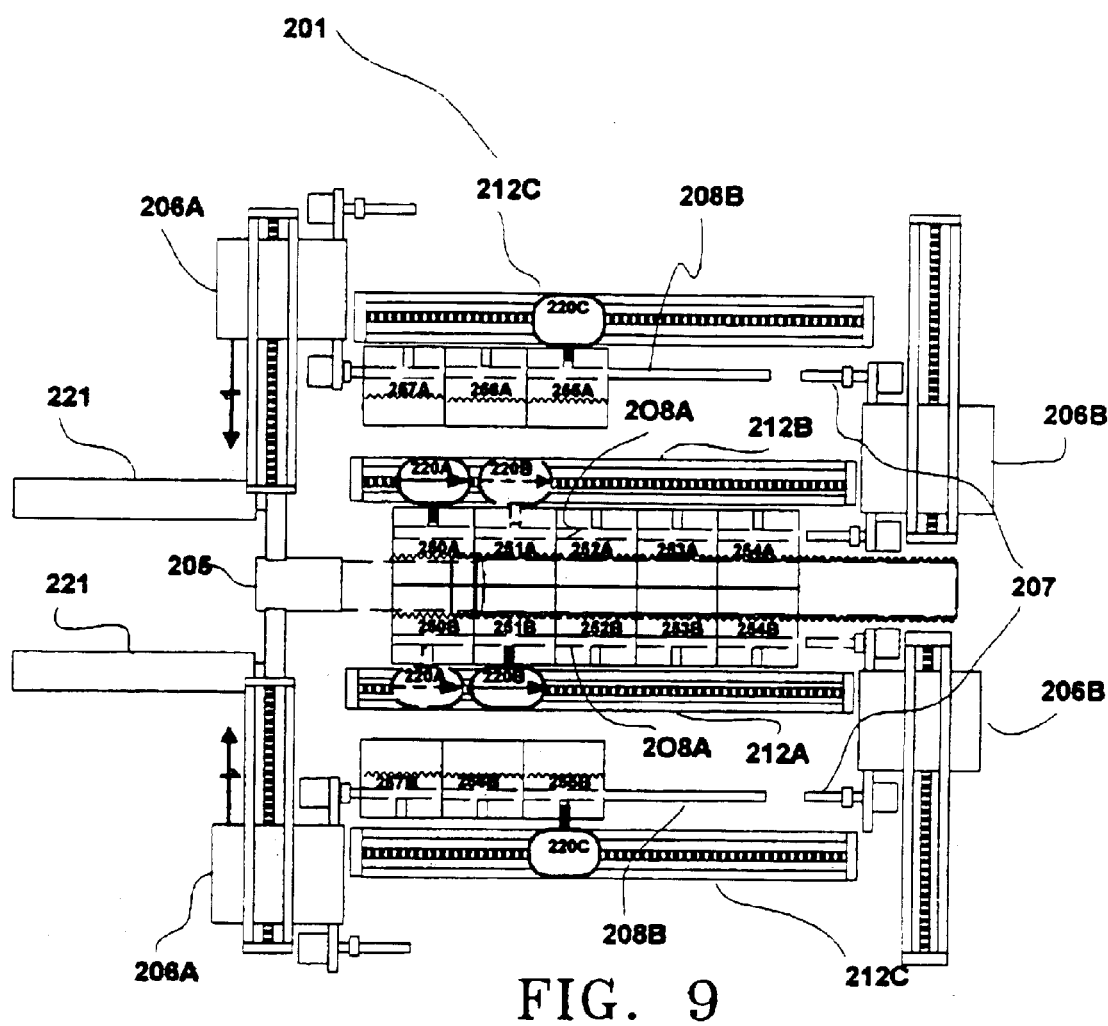
Figure 10:
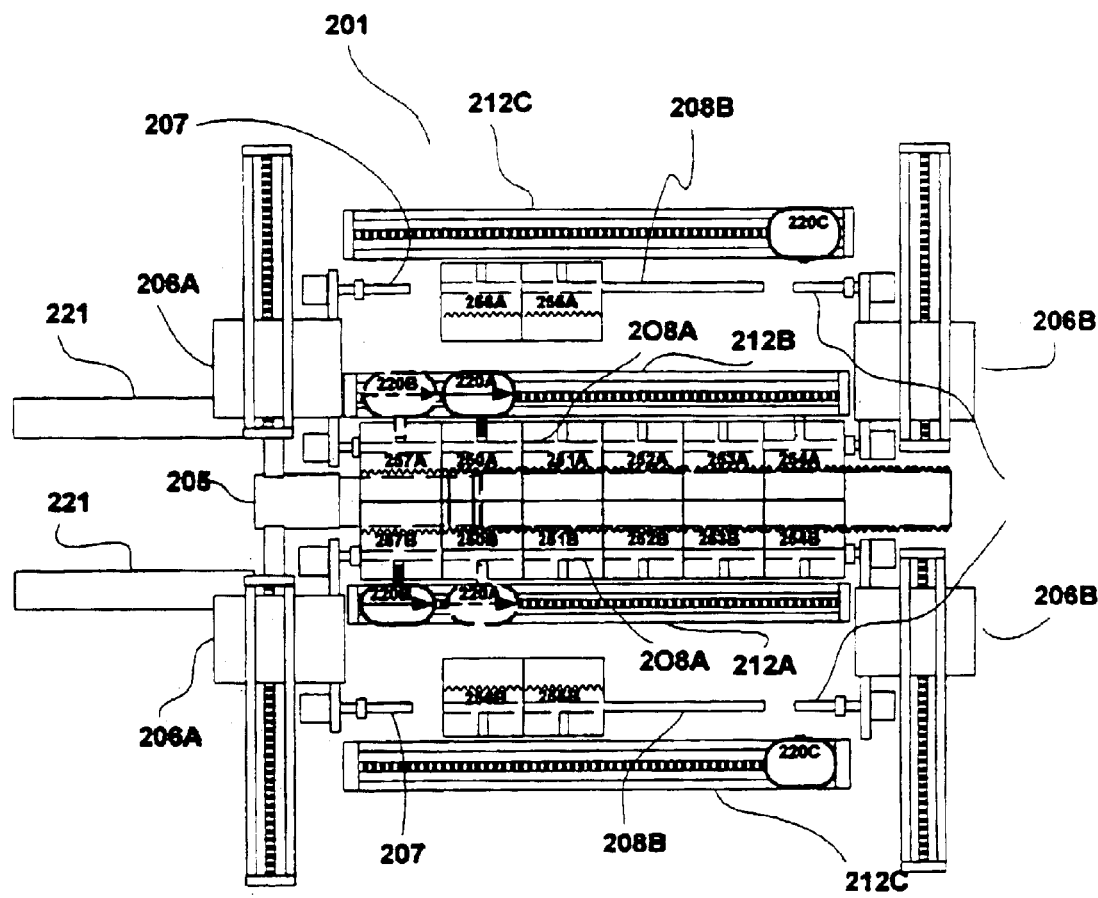

The method of circulating mold bases shown in FIGS. 6 through 10 portrays eight pairs of mold bases 250A through 257A and 250B through 257B in chronological and sequential steps that results in the mold base pair of 257A and 257B replacing mold base pair 250A and 250B shown in FIG. 7 at the entrance of the mold tunnel. The mold base tunnel is defined by the adjacent pairs of mold bases located along the inner pair of guide rails 208A. This is accomplished by the down stream pair of lateral transport units 206B moving the pair of mold bases 255A and 255B from the outer guide rails 208B to the inner guide rails 208A depicted in the motion shown by arrows in FIG. 7. The result of this movement is shown in FIG. 8. Similarly arrows marked 1 shown in FIG. 8 show the axial transfer of mold bases 255A and 255B onto and along guide rail 208B and the up stream pair of lateral transport units 206A moving outward. The result is shown in FIG. 9. The arrows 1 shown in FIG. 8 illustrate the pair of linear actuator modules 212C moving mold bases 255A and 255B along guide rails 208B, contacting and moving mold bases 256A and 256B until mold bases 257A and 257B are transferred to the protruding rails 207 on to the up stream pair of lateral transport units 206A. Arrows marked 2 show the down stream pair lateral transport units 206B returning inward. The result is shown in FIG. 9. The arrows 1 in FIG. 9 illustrate the anticipated inward movement of the up stream pair of lateral transport units 206A that result in moving mold bases 257A and 257B to the entrance of the mold tunnel. This result is shown in FIG. 10 which also illustrate linear actuator modules 212A and 212B cooperate to move platforms 220B upstream of platforms 220A wherein the two platforms 220B disengage mold bases 251A and 251B move up stream to the entrance of the mold tunnel and couple to mold bases 257A and 257B. FIGS. 7 through 10 show the circulation of one pair of mold bases the distance of the depth of one mold base. This cycle is repeated continuously during the operation of corrugator apparatus.

The figures herein showing the preferred embodiment depict each lateral transport unit with two pair of protruding rails 7 shown in FIG. 4 spaced so that when the lateral transport units move inward toward the axis of the extrusion die, the four protruding rails are collinear with the two supported rails in the mold tunnel and the two supported rails in the outer path. The pairs of protruding rails nearer the axis of the extrusion die function to circulate the mold bases. The second outer pair of protruding rails provides the means of introducing and removing mold bases on demand without disturbing the production operation described above. Having two pair of protruding rails on each lateral transport station enables the following:

1. two simultaneous bi-directional mold base transfers between the mold tunnel and the inner pair of protruding rails and between the outer path and the outer pair of protruding rails;
2. two simultaneous bi-directional mold base transfers between the inner pair of protruding rails and the outer path and between the outer pair of protruding rails and a mold base carrier located at a parking station; and
3. two simultaneous bi-directional mold base transfers between the inner pair of protruding rails and the outer path and between the outer pair of protruding rails and the pair of protruding rails on a delivery unit capable of loading and unloading mold bases at a multiplicity of parking stations having mold base carriers.

The above capabilities provide the means for "on the fly" mold base changes simultaneously and independently at four stations.

Figure 11:
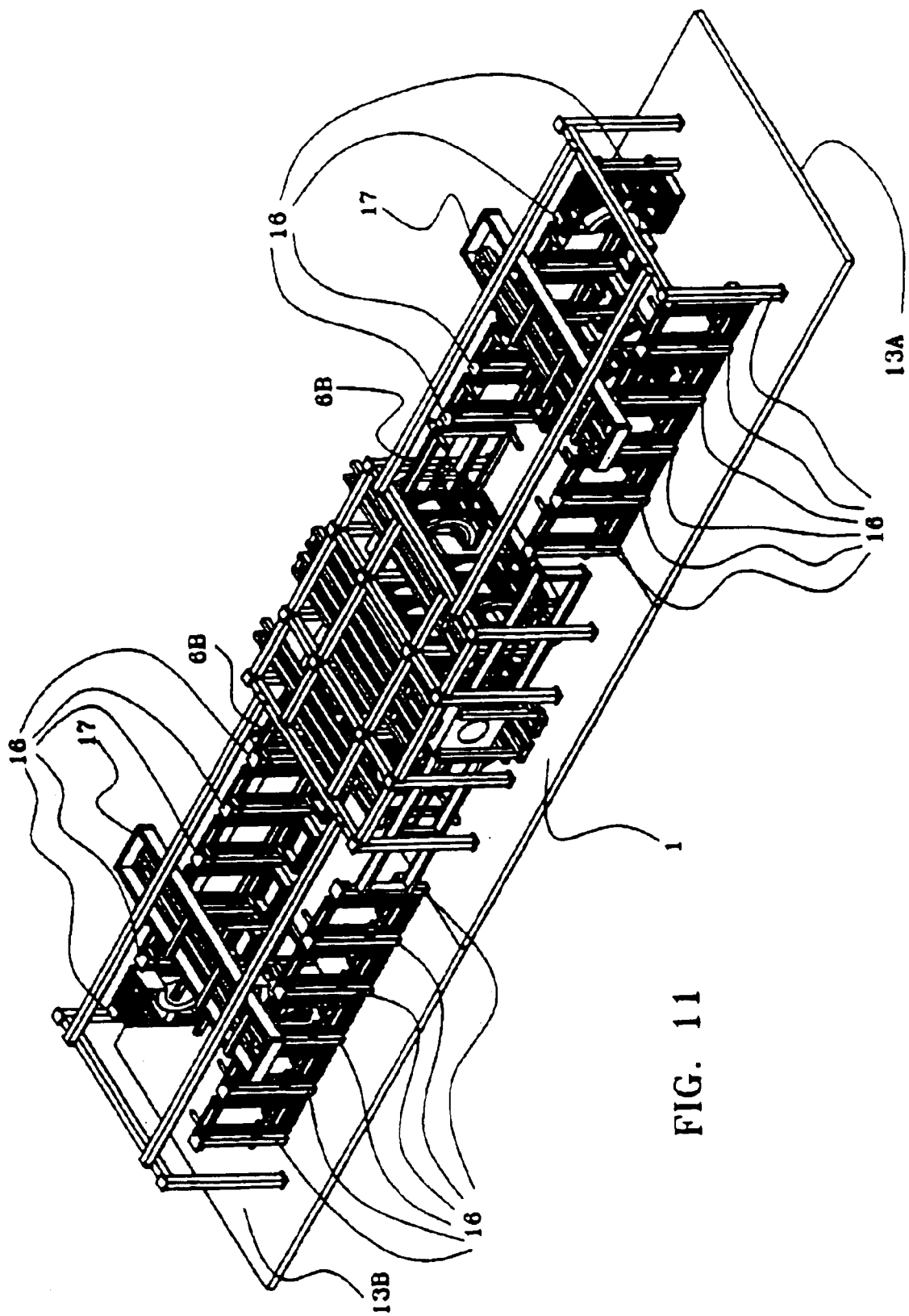
FIG. 11 is a perspective drawing of the corrugator apparatus with two mold base delivery units.
Figure 12:
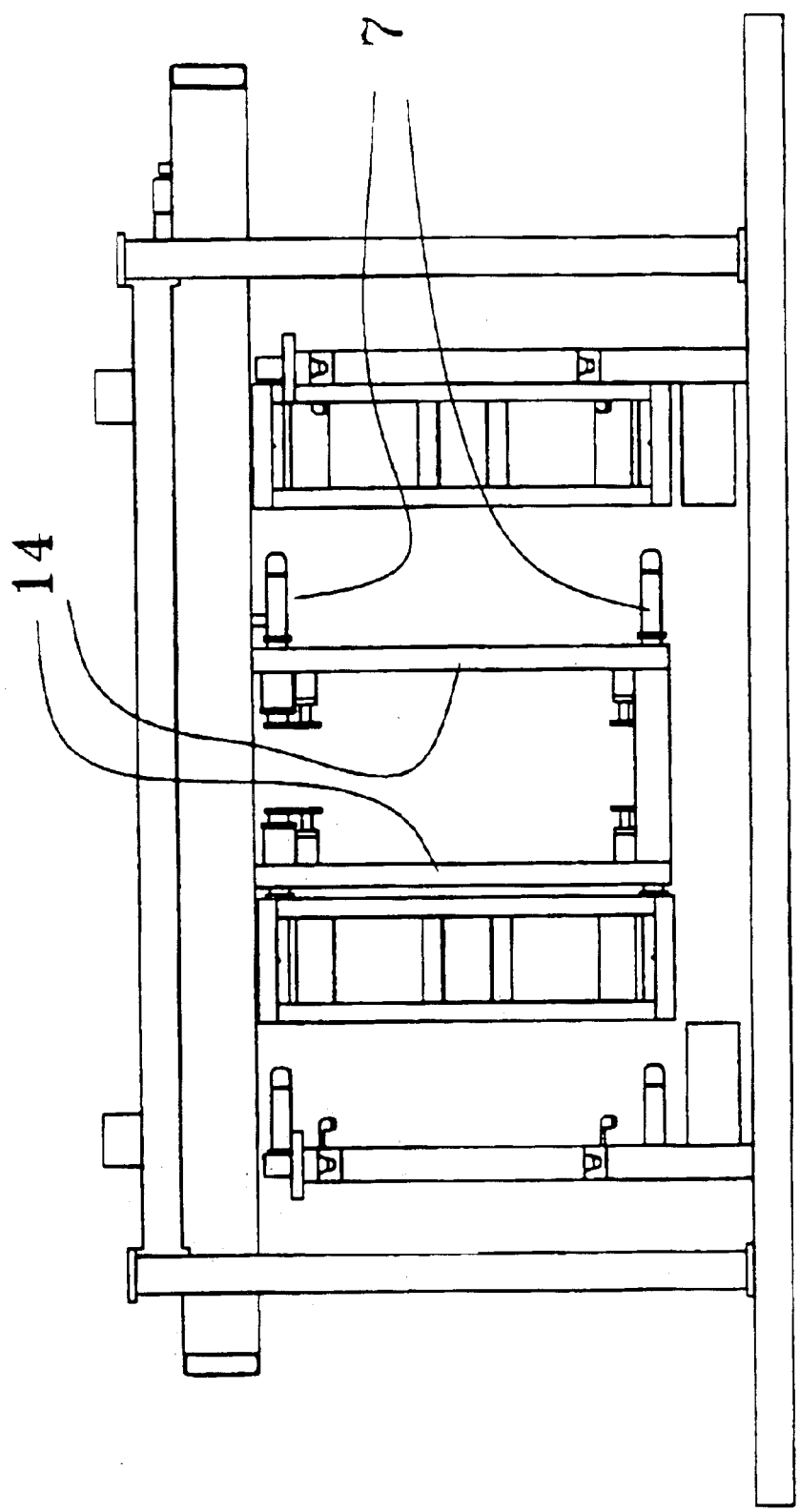
FIG. 12 an end view of a mold base delivery unit.
Figure 13:
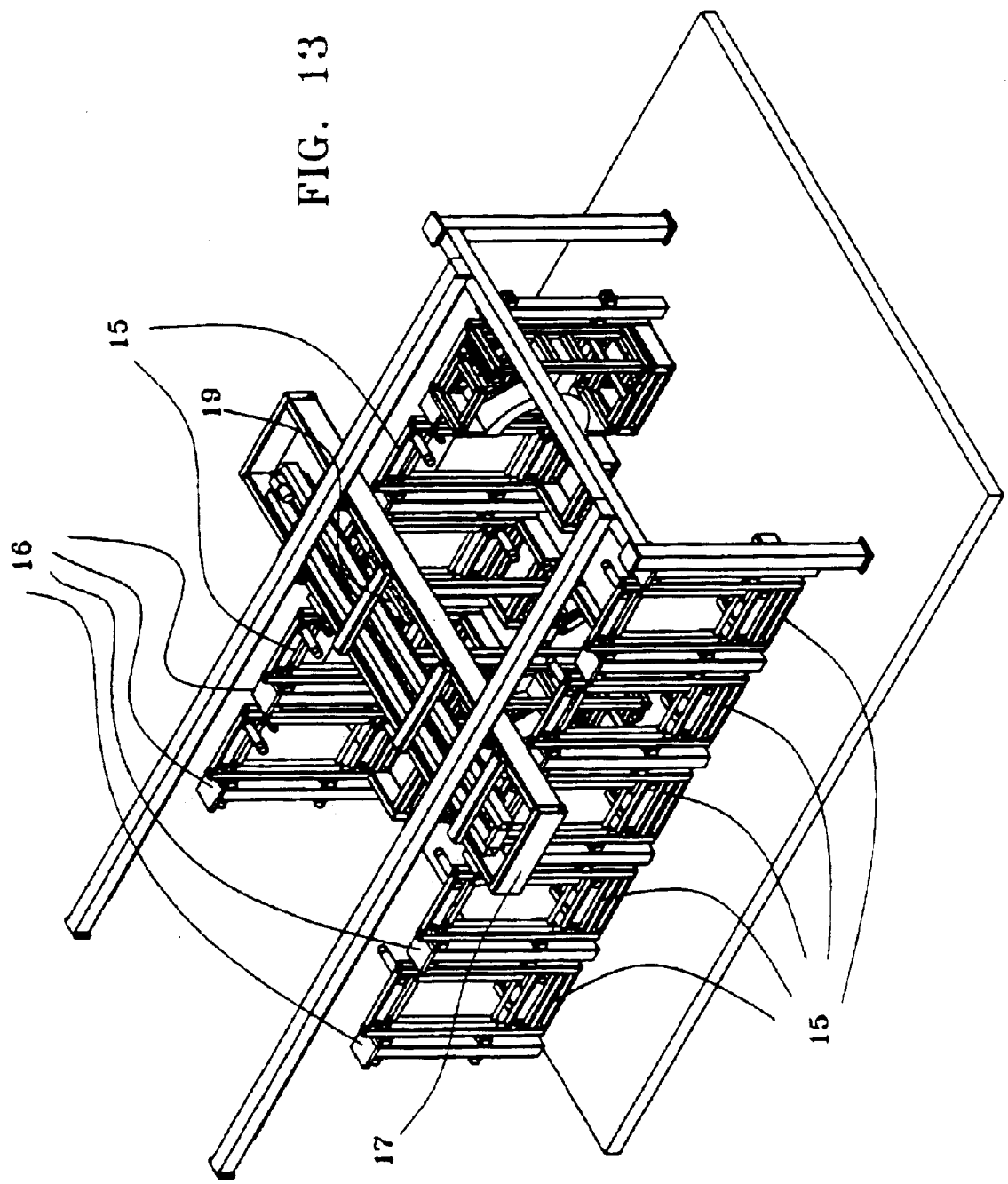
FIG. 13 is a perspective drawing of a mold base delivery unit.
Figures 13A, 14:
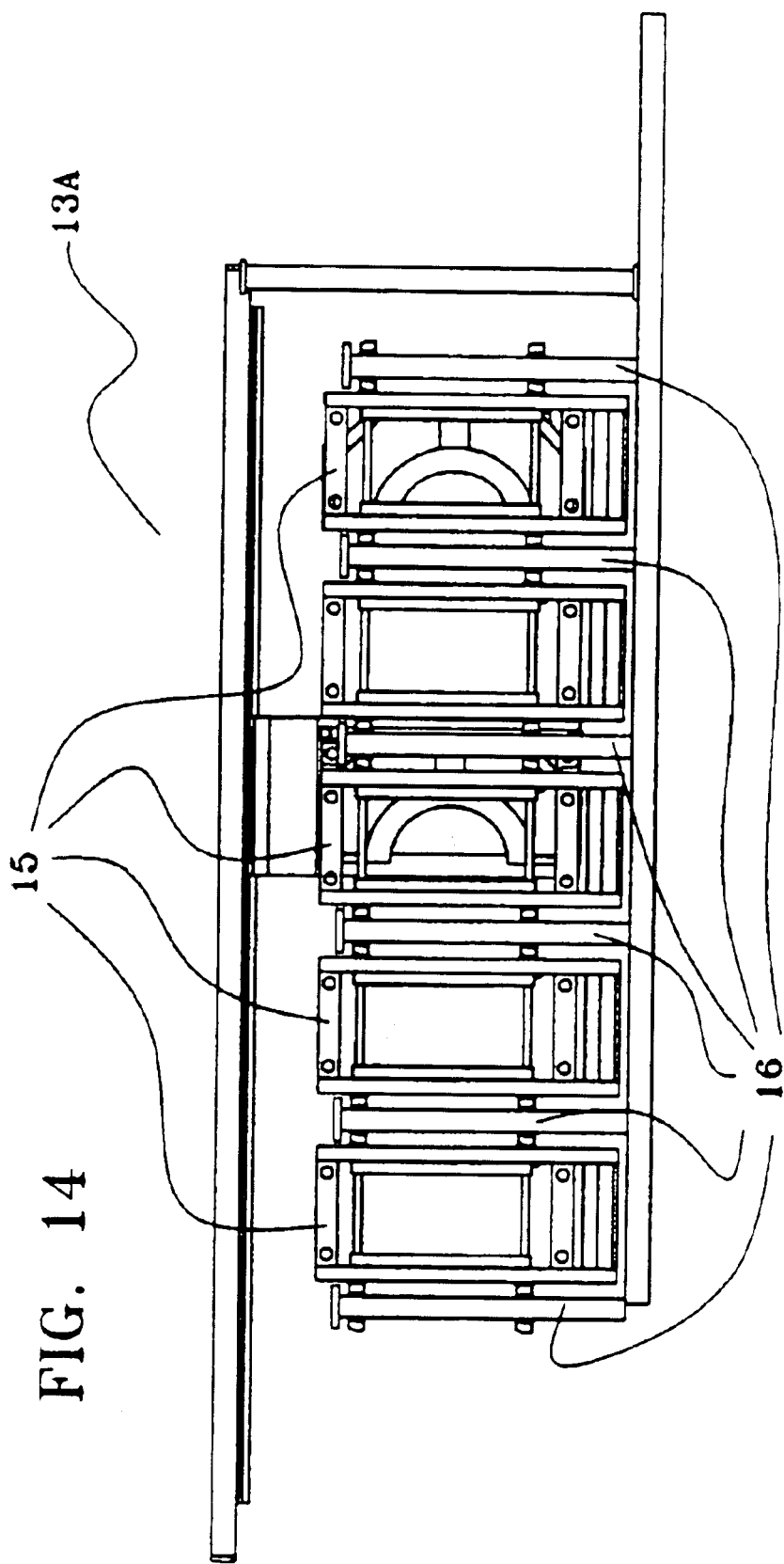
FIG. 14 is a frontal view of a mold base delivery unit.
Figure 15:
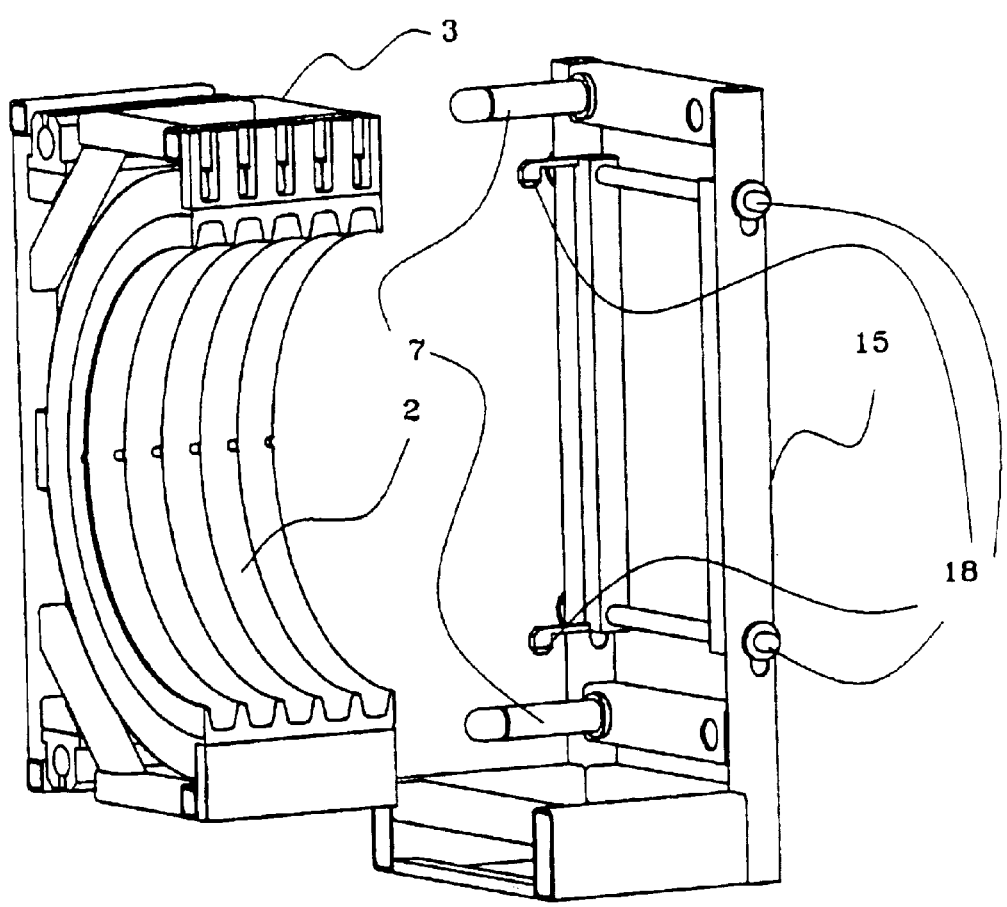
FIG. 15 is a perspective drawing of a mold base and a mold base carrier.
Figure 16:
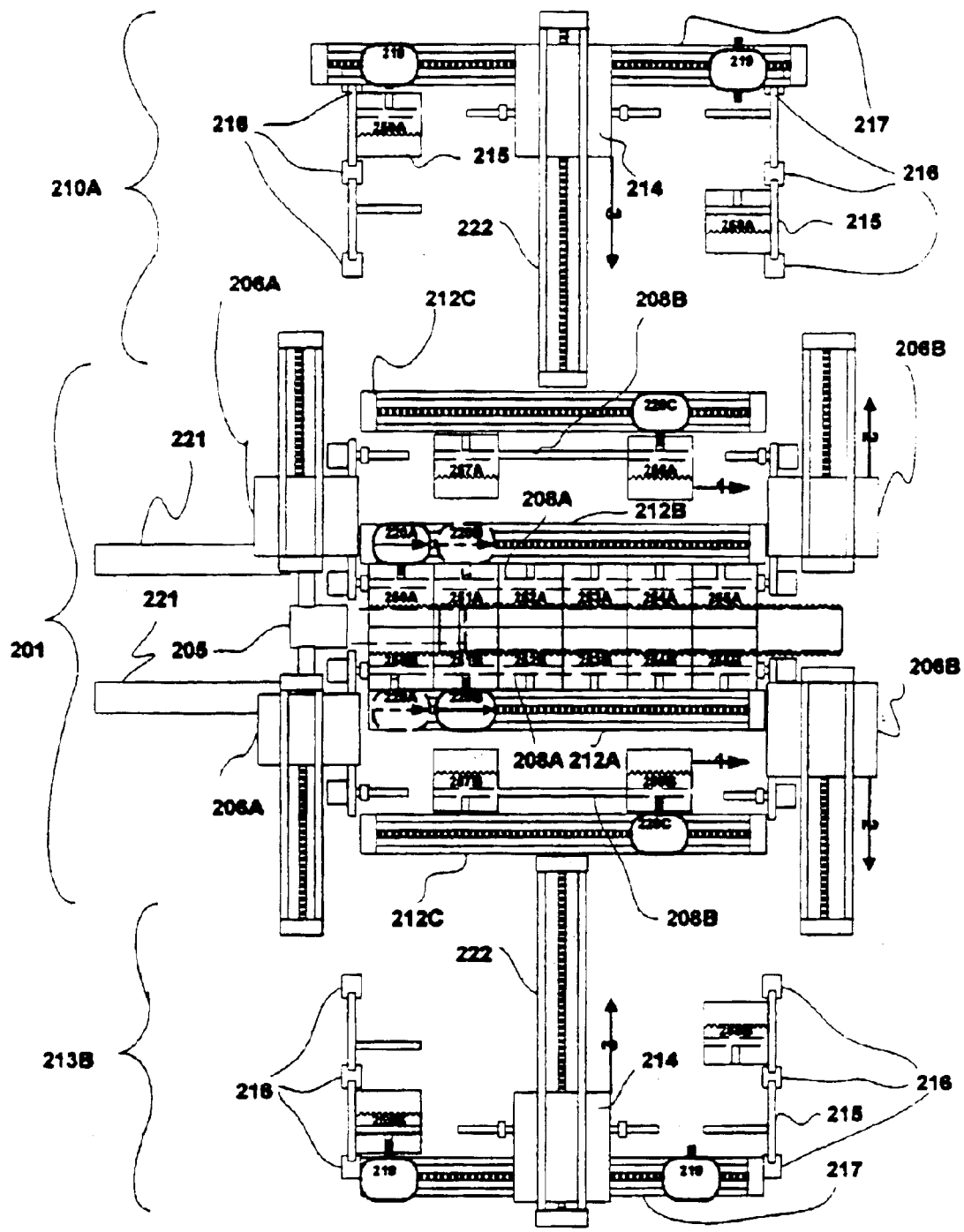
FIGS. 16 through 20 are sketches showing chronological steps in the on the fly mold change.
Figure 17:
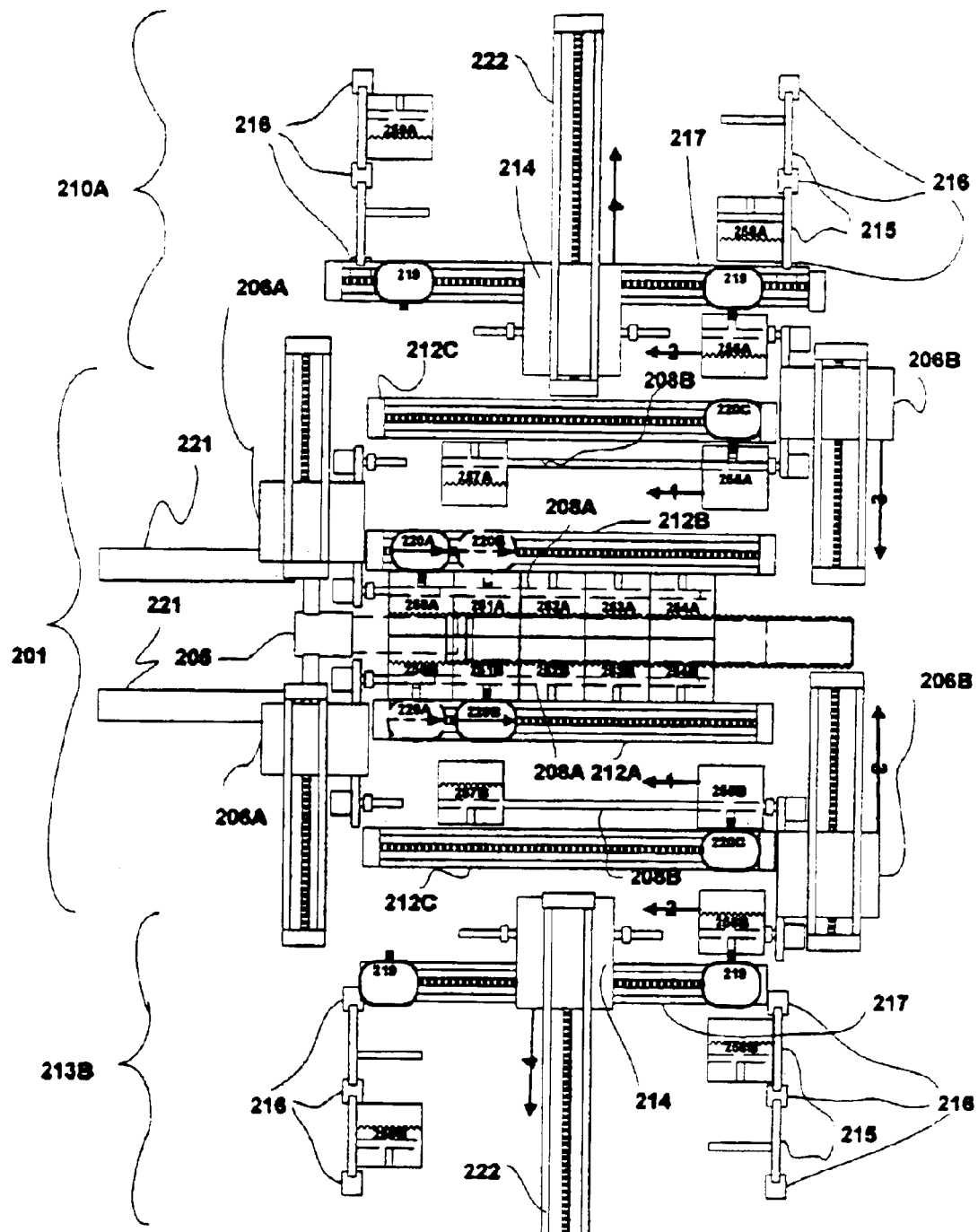
Figure 18:
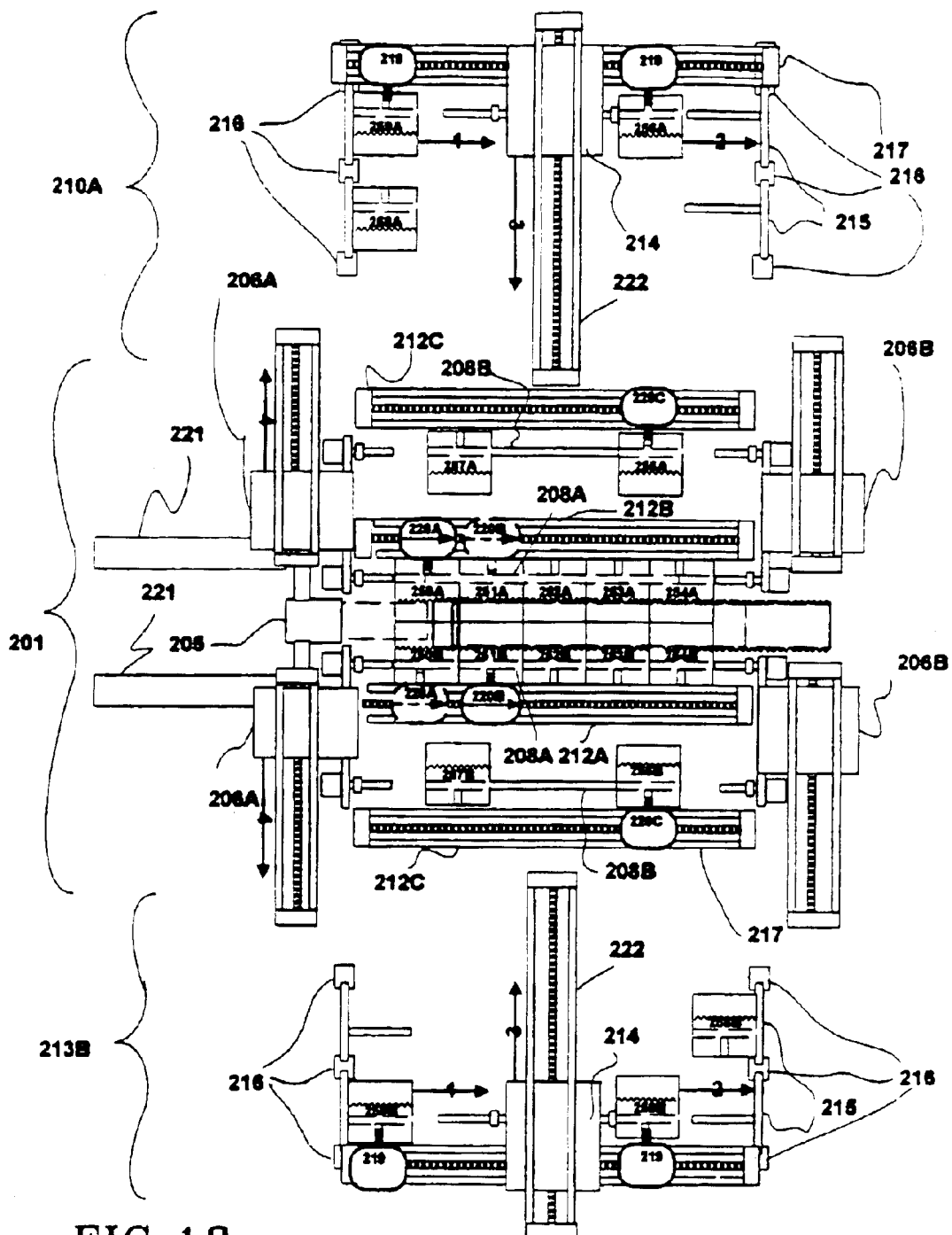
Figure 19:
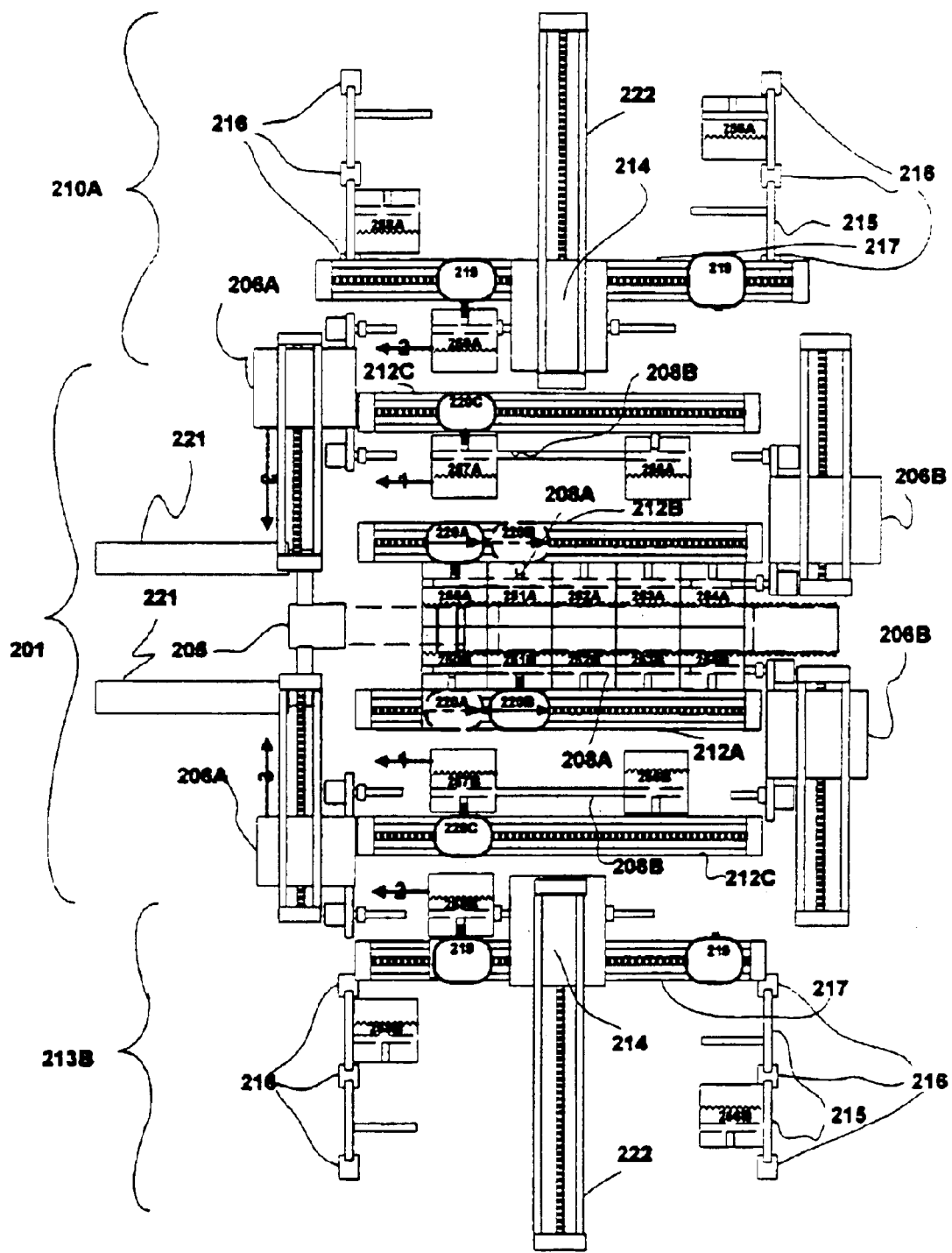
Figure 20:
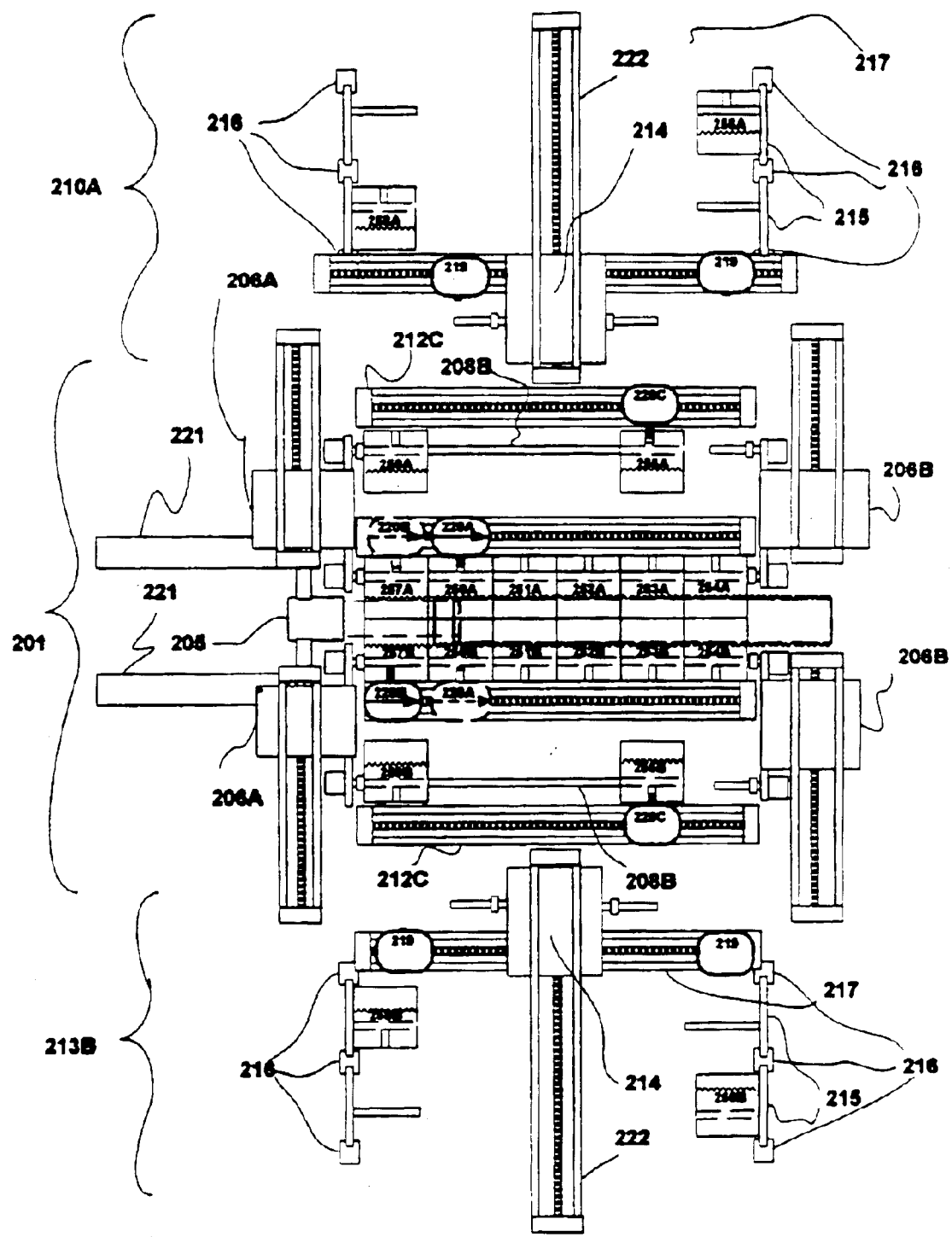

The preferred embodiment includes the corrugating apparatus 1 and two delivery units 13A and 13B shown in FIG. 11. Each delivery unit is comprised of:

1. carriage unit 14 shown in FIG. 12 having two pairs of protruding rails, one pair facing upstream and the other pair facing downstream;
2. a multiplicity of mold base carriers 15 shown in FIGS. 13, 14 and 15, each having a pair of protruding rails 7 that support and locate a mold base 3 shown in FIG. 15, an interlock device 18 to prevent the mold base from sliding off the pair of protruding rails 7 when transported outside the corrugated apparatus 1 and a means to locate and orient the mold base 3 when the mold base carrier 15 is placed in a parking station;
3. a multiplicity of parking stations, each comprising two posts 16 shown in FIGS. 11, 13 and 14 capable of locating and orienting the mold base carriers for transfer to and from the carriage unit;
4. a bi-directional lateral linear actuator module 222 shown in FIGS. 16 through 22, for moving the carriage in a manner that provides access to a multiplicity of mold base carriers located between parking station posts and the outer pair of protruding rails on the lateral transport unit; and
5. a bi-directional linear actuator module 17 shown in FIGS. 11 and 13 that moves with and is associated with the mold base carriage 14 shown in FIG. 12.

The bi-directional linear actuator module has a moving platform 19 shown in FIG. 13 capable of coupling to and moving a mold base upstream and downstream between the mold carriers located at parking stations and pairs of protruding rails on the carriage unit and between the pairs of protruding rails on the carriage station and the outer pair of protruding rails on the lateral transport unit 6B shown in FIG. 11.

The method of exchanging a pair of mold bases located between parking station posts with a pre-selected pair of mold bases is outlined in the sequential and chronological sequence of FIGS. 16 through 20. The addition of the two delivery units 13A and 13B characterized as 213A and 213B respectively to the corrugating apparatus makes it possible to change mold bases on demand shown in FIGS. 16 through 20. The mold base carriers 15 are characterized as 215, the parking station posts 16 are characterized as 216, the mold base carriages 14 are characterized as 214, the linear actuator modules 17 are characterized as 217 and the associated platform 19 are characterized as 219. Mold bases 258A, 258B, 259A and 259B represent mold bases in between parking station posts 16 designated as 216. The series of sequential and chronological FIGS. 16 through 20 demonstrate how mold bases 259A and 259B are exchanged with mold bases 256A and 256B in the corrugator unit. This is accomplished through a series of axial and lateral movements wherein the circulating operational cycles of the corrugator apparatus is not affected. Arrows are sequentially labeled to indicate the axial and lateral movements required to go from one figure in the sequence to the next.

The method for changing mold base pairs during and without interfering with the operation of the corrugator apparatus is shown in FIGS. 7 through 10 wherein mold bases are axially and laterally transferred among the inner rail pairs 208A, 208B, mold base carriage 214 and parking station posts 216.

Figure 21:
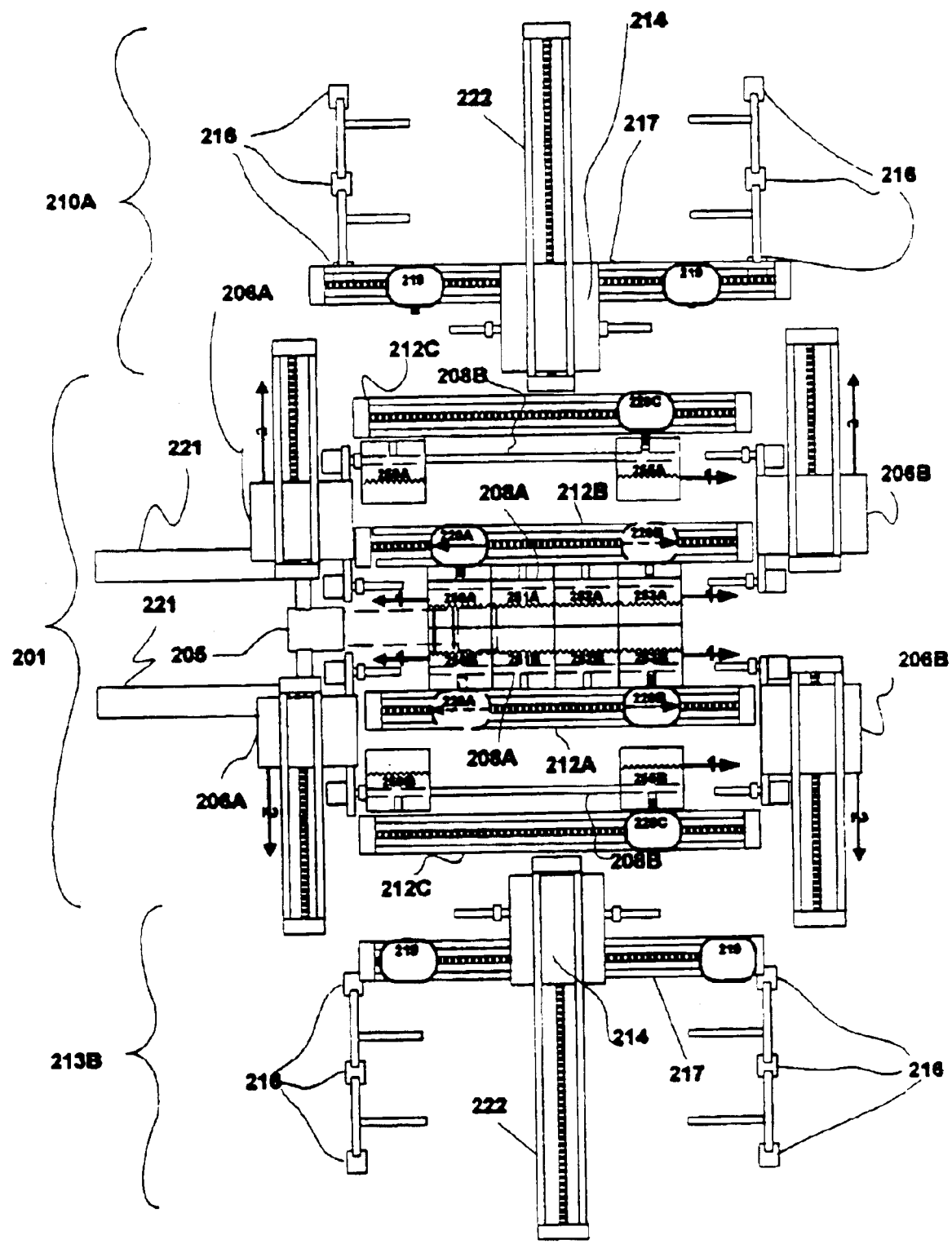
FIGS. 21 and 22 are sketches showing the method of removing two molds simultaneously from the mold tunnel.
Figure 22:
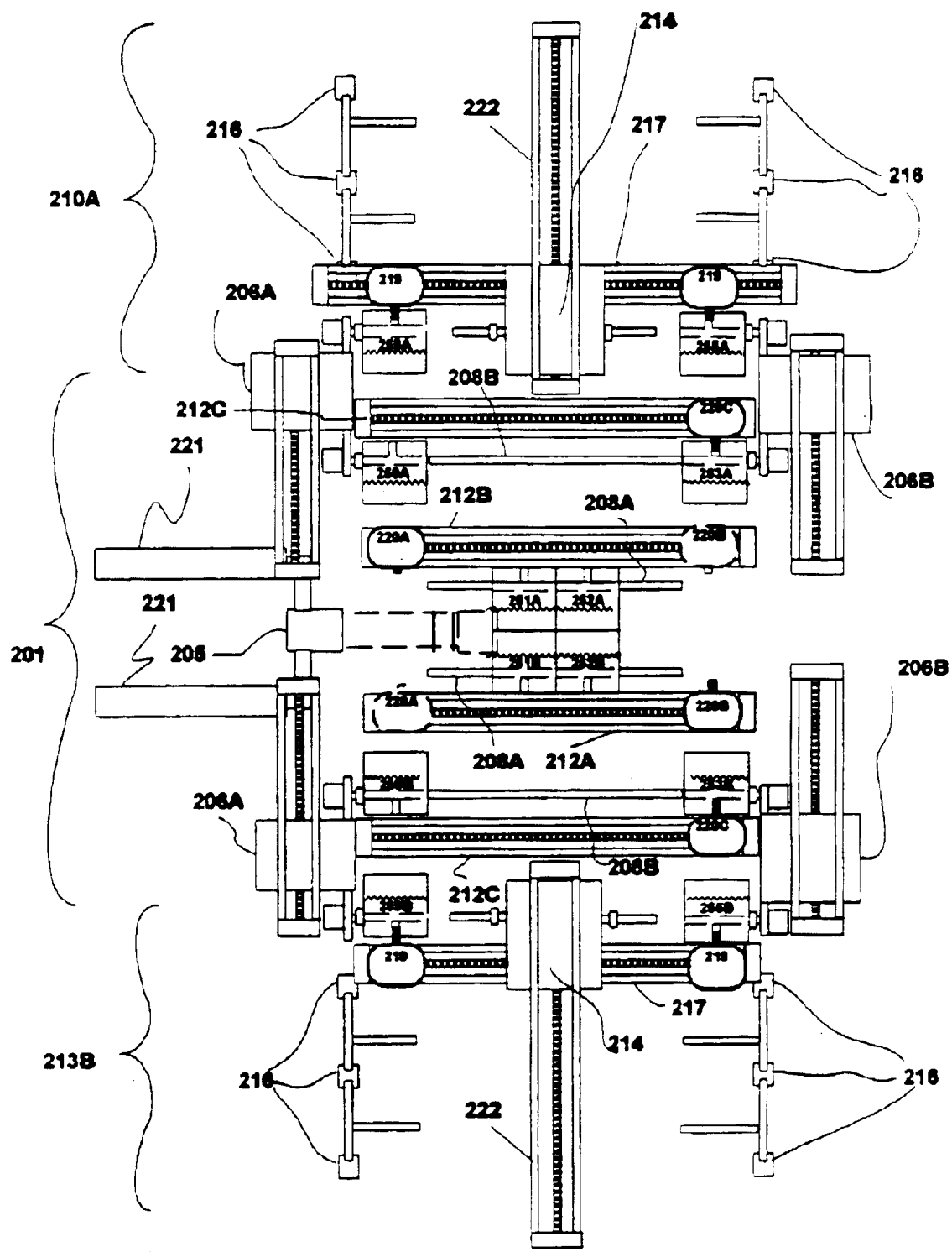

FIGS. 21 and 22 illustrate a method wherein:

1. the bi-directional linear actuator modules 220A and 220B act simultaneously to move mold base pair 250A and 250B on to the upstream lateral transport unit 206A and mold base pair 253A and 253B on to the down stream lateral transport unit 206B.
2. the lateral transport units 206A and 206B simultaneously transfer mold bases 250A, 250B, 253A and 253B from inner rails 208A to outer rails 208B and mold bases 255A and 255B and 259A and 259B from outer rails 208B to the mold base carriages 214.

The method purges mold bases resident in the corrugator apparatus by simultaneously removing four mold bases from the corrugating apparatus at four separate and distinct locations and moving four other mold bases from the mold base tunnel to the outer paths. This process can also be reversed to introduce mold bases to the corrugator apparatus.

The preferred embodiment has the capability of identifying mold bases, individually, and determining their location (s). This is accomplished by a scanning device, for example, a bar code reader located on each of the moving platforms associated with the bi-directional linear actuator modules, by applying an identification mark, for example a bar code, used to measure their travel, for example an optical encoder on the motor driving the lead screw or linear encoder. The bi-directional linear actuators can scan all the positions on demand by disengaging their coupling devices and moving the full length of their travel. The preferred method is to scan, locate and track by simply storing locations and identity whenever a mold base passes a bar code reader.

The preferred lateral transport unit 6A and 6B shown in FIGS. 1, 3, 4, 5 and 6 is composed of a lead screw and two linear bearings configured to move a frame in a vertical plane normal to the axis of extrusion die back and forth in a direction normal to the vertical plane containing the axis of the extrusion die. Pneumatic, hydraulic, and timing belt linear actuators would also satisfy the station to station movement requirement.

Preferred bi-directional linear actuator modules 12A, 12B and 12C shown in FIGS. 1, 3, 4 and 5 are each composed of a lead screw and two linear bearings and a platform 20 shown in FIGS. 3 and 4 attached to a nut that engages the lead screw as well as motor drive and optical encoder configured to move a platform having a bar code reader and electromagnet. Other known linear actuator modules may be used satisfactorily; examples are rack and pinion drives, timing belt drives, and lead screw drives.

Figure 5:
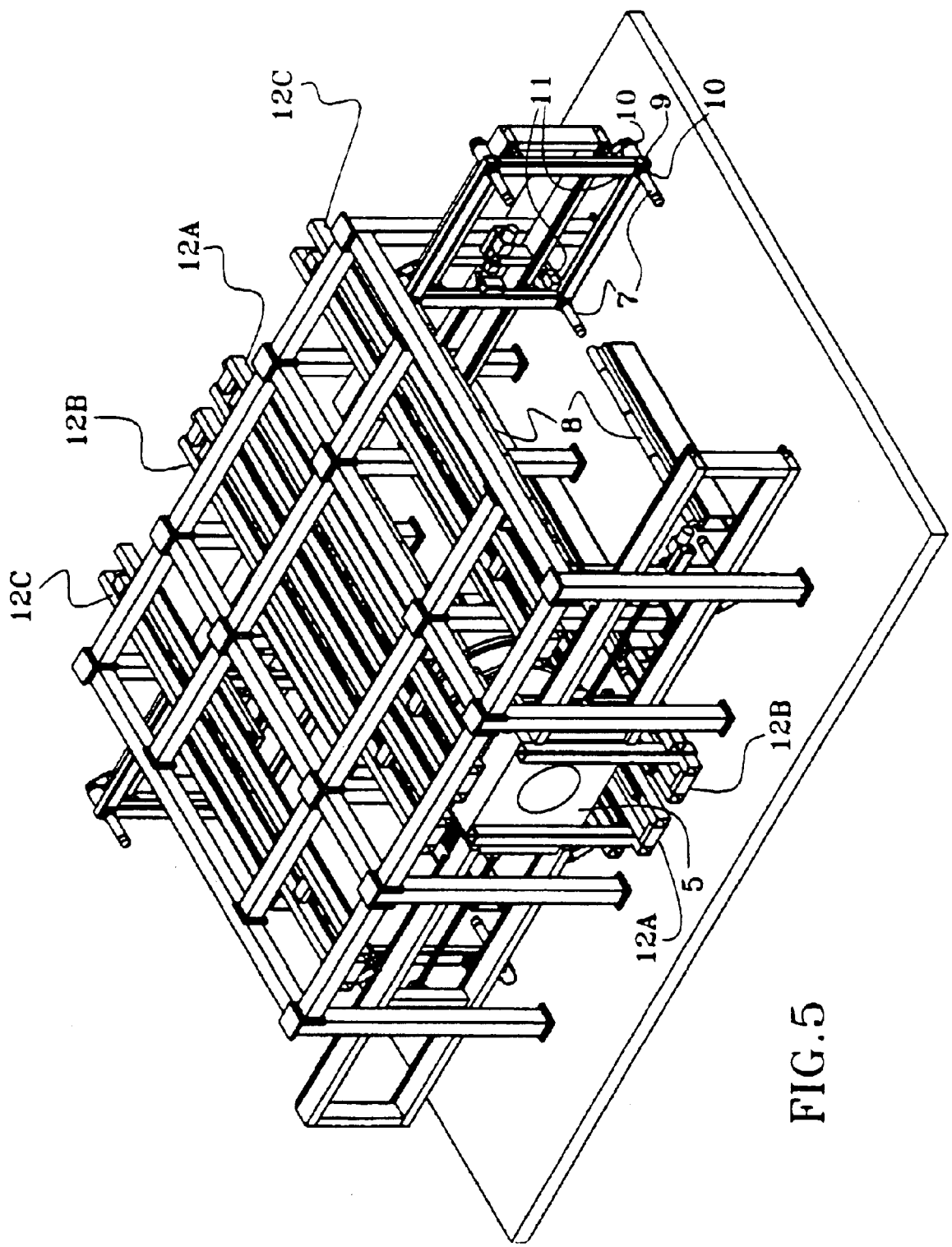
FIG. 5 shows perspective drawing of the corrugator apparatus purged of all mold bases.

Each bi-directional linear actuator module 12C shown in FIGS. 1, 3, 4 and 5 on the two outer paths slide a mold base on its integral pair of open linear bushings from pair of supported rails 8 in FIG. 5 on to the pair of protruding rails located on the lateral transfer unit. The lateral transport units move the both mold bases until they mate at the axis of the extrusion die wherein the opposing diagonal pair of linear actuator modules slide the interlocked and mated pair of mold bases off the protruding rails and on to the supported rails. The diagonally opposing pair of linear actuator modules 12A and 12B are synchronized to alternate removing the circulating interlocked and mated pairs of mold bases in a fashion that each pair alternates moving an interlocked and mated pair of mold bases from the lateral transport unit so that the downstream pair of linear actuators does not disengage until the upstream linear actuator module is providing a steady speed that matches the extrusion rate of the polymer melt parison.

Similarly the delivery units 13A and 13B have bi-directional linear actuator modules 17 shown in FIGS. 11 and 13 and characterized as 217 in FIGS. 16 through 22 that act to supply up stream and down stream axially motion to integral platforms 19 shown in FIG. 13 and characterized as 219 in FIGS. 16 through 22 and as well as directional linear actuator modules characterized as 222 in FIGS. 16 through 22 act to supply lateral motion to mold base carriages 14 characterized as 214 in FIGS. 16 through 22. In the preferred embodiment the linear actuator modules are each composed of a lead screw and two linear bearings and a platform 19 shown in FIG. 13 and the mold base carriage characterized in FIGS. 16 through 22 attached to a nut that engages the lead screw as well as motor drive and optical encoder configured to move a platform having a bar code reader and electromagnet. There are other known linear actuator modules that could be utilized satisfactorily; examples are rack and pinion drives, timing belt drives, and lead screw drives.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims.

What is claimed is:

1. An apparatus for continuously forming transverse molded shapes in a tubular polymer melt parison formed by an extrusion die, the apparatus comprising separate circulating paths laterally disposed on opposite sides of the parison as the parison exits from the die, each of the circulating paths including:
   a. a plurality of separate mold sections for forming the shapes, each of the mold sections having common outside dimensions and an integral pair of open linear bearings providing a common means to locate each mold section in a predetermined position with respect to the central longitudinal axis of the parison;
   b. a first pair of parallel and spaced-apart supported rails simultaneously engageable with each of the integral pair of open linear bearings of the mold sections, said first pair of supported rails disposed to define an outer path to transport mold sections between downstream and upstream locations of the outer path with respect to the extrusion die;
   c. a second pair of parallel and spaced-apart supported rails simultaneously engageable with each of the integral pair of open linear bearings of the mold sections, said second pair of supported rails disposed to define an inner path for the mold sections such that the longitudinal axis of each mold section is maintained in a co-linear relationship with the central longitudinal axis of the parison;
   d. a first lateral transport unit for the mold sections disposed upstream from the first and second pairs of supported rails and selectively transporting the mold sections from the outer path to the inner path; and
   e. a second lateral transport unit for the mold sections disposed downstream from the first and second pairs of supported rails and selectively transporting the mold sections from the inner path to the outer path.

2. The apparatus of claim 1 in which the mold sections on opposite sides of the parison are disposed to move as a pair synchronously with the movement of the parison as the parison exits the die.

3. The apparatus of claim 1 in which mold sections are circulated downstream on the inner path, laterally from the inner path to the outer path, upstream on the outer path, and laterally from the outer path to the inner path.

4. The apparatus of claim 2 in which more than one mold section on each side is engaged with the parison and moved synchronously with the parison.

5. The apparatus of claim 1 in which the rails of the first pair are vertically spaced apart to form a parallel vertical relationship and the rails of the second pair are vertically spaced apart to form a parallel vertical relationship.

6. The apparatus of claim 1 in which the rails of the first pair are parallel and horizontally spaced apart from the rails of the second pair to form a parallel horizontal relationship.

7. The apparatus of claim 1 in which the first and second lateral transport units each include a pair of parallel and spaced-apart rails that receive the mold sections, and the pair of rails of each of the first and second transport units are parallel with the longitudinal axis of the parison so that the pair rails of the first and second transport units are coaxially alignable with ends of the first and second pairs of supported rails for transporting mold sections between the first and second pairs of supported rails.

8. The apparatus of claim 7 in which the first and second lateral transport units each include a second pair of parallel and spaced-apart rails displaced from the first pair of rails of the lateral transport units laterally outward from the extrusion die axis a distance equal to the distance between the first pair of supported rails and the second pair of supported rails.

9. The apparatus of claim 7 wherein the pair of rails of the lateral transport units are longitudinally extensible and contractible to engage and disengage the mold sections.

10. The apparatus of claim 8 wherein both the first and second pairs of rails of the lateral transport units are longitudinally extensible and contractible to engage and disengage the mold sections.

11. The apparatus of claim 1 in which at least one bi-directional linear actuator module cooperatively associated with the first pair and the second pair of supported rails is capable of temporarily coupling with and moving a mold section along the first pair of supported rails and the second pair of supported rails.

12. The apparatus of claim 1 in which mold sections on opposite sides of the parison are maintained in a fixed axial and vertical alignment with each other so that the longitudinal axis of each of the mold sections remain parallel with the central longitudinal axis of the parison throughout the circulating paths.

13. The apparatus of claim 2 including a bi-directional linear actuator module oriented with regard to the central longitudinal axis of the parison and the first and second pairs of rails such that the linear actuator module transfers a mold section from the first lateral transport unit onto the inner path, or to the first lateral transport unit from the outer path.

14. The apparatus of claim 2 including a bi-directional linear actuator module oriented with regard to the central longitudinal axis of the parison and the first and second pairs of rails such that the linear actuator module transfers a mold section from the second lateral transport unit onto the outer path, or to the second lateral transport unit from the inner path.

15. The apparatus of claim 2 including a pair of bi-directional linear actuator modules oriented such that the linear actuator modules alternate between transferring a mold section from the first unit onto the inner path and driving the mold section downstream along the inner path to transferring a mold section to the second transport unit onto the outer path and driving the mold section upstream along the outer path.

16. The apparatus of claim 15 including two pair of the bi-directional linear actuator modules oriented with regard to the vertical plane containing the central longitudinal axis of the parison in an opposing diagonal relationship alternatingly transferring the mold sections.

17. The apparatus of claim 13 in which the linear actuator modules comprise means for moving a mold section downstream or upstream.

18. The apparatus of claim 13 in which the linear actuator modules include means for coupling with a mold section.

19. The apparatus of claim 13 in which the linear actuator modules include means for transferring mold sections on and off the first and second lateral transport units.

20. The apparatus of claim 2 including means for cyclically circulating the mold sections in synchronous movement with the parison from an upstream location a predetermined distance downstream on the first second of rails, then laterally outward from the second pair of rails onto the second lateral transport unit then onto the first pair of rails upstream to and then laterally to the first lateral transport unit to return the mold section to the upstream location.

21. An apparatus for continuously forming transverse corrugations in a tubular polymer melt parison formed by an extrusion die, the apparatus comprising separate circulating paths laterally disposed on opposite sides of the parison as the parison exits from the die, each of the circulating paths including:

a. a plurality of separate mold sections for forming the shapes, each of the mold sections having common outside dimensions and an integral linear bearing providing a common means to locate each mold section in a predetermined position with respect to the central longitudinal axis of the parison;

b. a first supported rail extending upstream and downstream with regard to the parison, the rail engageable with the linear bearing of the mold sections, said first supported rail disposed to define an inner path for the mold sections such that the mold sections are maintained in a co-linear relationship with the parison with regard to movement of the parison as the parison exits the extrusion die at an upstream location and moves toward a downstream location;

c. a second supported rail extending between upstream and downstream locations and engageable with the linear bearing of the mold sections, said second supported rail disposed to define an outer path to transport mold sections between downstream and upstream locations of the outer path; and d. an outer lateral transport unit and an inner pair of lateral transport units disposed at upstream and downstream locations of the first and second supported rails, each inner lateral transport unit having two parallel and spaced-apart rails to receive mold sections and being separated a distance equal to the lateral separation of the first and second supported rails, the two rails of each of the inner transport units are parallel with the longitudinal axis of the parison so that the two rails of the inner transport units are coaxially alignable with ends of the first and second supported rails for transporting mold sections between the first and second supported rails.

22. The apparatus of claim 21 further including a carriage for transporting mold sections from and to the outer lateral transport unit and to and from the outer lateral transport unit to a parking station.

23. The apparatus of claim 21 in which the outer lateral transport unit is disposed laterally away from the second supported rail in a direction opposite the first supported rail a distance equivalent to the separation distance between the first pair and the second pair of supported rails.

24. The apparatus of claim 23 further including a carriage for transporting mold sections from and to the outer lateral transport units and to and from the outer lateral transport unit to a parking station.

25. The apparatus of claim 22 in which the carriage includes a rail for receiving mold sections co-operatively engageable with the linear bearing on the mold sections.

26. The apparatus of claim 24 in which the carriage includes a rail for receiving mold sections co-operatively engageable with the linear bearings on the mold sections.

27. The apparatus of claim 25 in which the carriage includes a bi-directional linear actuator module capable of coupling and uncoupling with a mold section.

28. The apparatus of claim 26 in which each carriage includes a bi-directional linear actuator module capable of coupling and uncoupling with a mold section.

29. The apparatus of claim 26 including a carrier that receives a mold section for transport, the carrier having an alignment means co-operative with means on the mold section for positioning the mold section at a predetermined position in the carrier.

30. An apparatus for continuously forming transverse shapes in a tubular polymer melt parison formed by an extrusion die, the apparatus including, comprising separate circulating paths laterally disposed on opposite sides of the parison as the parison exits from the die, each of the circulating paths including:
  a. a plurality of separate mold sections for forming the shapes, each of the mold sections having common outside dimensions and integral bearings providing a common means to locate each mold section in a predetermined position with respect to the central longitudinal axis of the parison;
  b. a first pair of parallel and vertically spaced-apart supported rails extending upstream and downstream with regard to the parison, the rails engageable with the bearings of the mold sections, said first pair of supported rails disposed to define an inner path for the mold sections such that the mold sections are maintained in a co-linear relationship with the parison with regard to movement of the parison as the parison exits the extrusion die at an upstream location and moves toward a downstream location;
  c. a second pair of parallel and vertically spaced-apart supported rails extending between upstream and downstream locations and engageable with the bearings of the mold sections, said second pair of supported rails disposed to define an outer path to transport mold sections between downstream and upstream locations of the outer path;
  d. a pair of inner lateral transport units disposed at upstream and downstream locations of the supported rails for transporting mold sections between the first pair of supported rails and the second pair of supported rails from locations between and including upstream and downstream locations on the first and second pairs of supported rails, each inner lateral transport unit having two pairs of parallel and vertically-spaced-apart rails to receive mold sections and being laterally separated a distance equal to the lateral separation of the first and second pairs of supported rails, the two pairs of rails of each of the inner transport units are parallel with the longitudinal axis of the parison so that the two pairs of rails of the inner transport units are coaxially alignable with ends of the first and second pairs of supported rails for transporting mold sections between the first and second supported rails; and
  e. an outer lateral transport unit disposed laterally away from the second pair of supported rails opposite the first pair of supported rails a distance equivalent to the separation distance between the first pair and the second pair of supported rails.

31. The apparatus of claim 30 further including a carriage with rails oriented upstream and downstream for transporting mold sections from and to the outer lateral transport units and to and from the outer lateral transport units to a plurality of parking stations.

32. The apparatus of claim 31 further including means for identifying the mold sections and their locations at least with regard to the first and second pairs of rails and the parking stations.

33. The apparatus of claim 32 including a programmed central control mechanism for identifying, locating and tracking molds with regard to their location on the apparatus.

34. The apparatus of claim 1 in which the first pair of supported rails simultaneously extend through the integral pair of open linear bearings of the mold sections when the mold sections are moving along the first pair of supported rails, and the second pair of supported rails simultaneously extend through the integral pair of open linear bearings of the mold sections when the mold sections are moving along the second pair of supported rails.

35. The apparatus of claim 7 in which the pairs of rails of each of the first and second lateral transport units remain parallel with the central longitudinal axis of the parison as the first and second lateral transport units move the mold sections between the first and second pairs of supported rails so that the longitudinal axis of the mold sections remains parallel with the central longitudinal axis of the parison as the mold sections move between first and second pairs of supported rails.

36. The apparatus of claim 21 in which the two rails of each of the inner lateral transport units remain parallel with the central longitudinal axis of the parison as the inner lateral transport units move the mold sections between the first and second supported rails so that the longitudinal axis of the mold sections remains parallel with the central longitudinal axis of the parison as the mold sections move between first and second supported rails.

37. The apparatus of claim 21 wherein the two rails of each of the inner lateral transport units are longitudinally extensible and contractible to engage and disengage the mold sections.

38. The apparatus of claim 30 in which the first pair of supported rails simultaneously extend through the integral pair of open linear bearings of the mold sections when the mold sections are moving along the first pair of supported rails, and the second pair of supported rails simultaneously extend through the integral pair of open linear bearings of the mold sections when the mold sections are moving along the second pair of supported rails.

39. The apparatus of claim 30 in which the two pairs of rails of each of the inner lateral transport units remain parallel with the central longitudinal axis of the parison as the inner lateral transport units move the mold sections between the first and second pairs of supported rails so that the longitudinal axis of the mold sections remains parallel with the central longitudinal axis of the parison as the mold sections move between first and second pairs of supported rails.

40. The apparatus of claim 30 wherein the two pairs of rails of each of the inner lateral transport units are longitudinally extensible and contractible to engage and disengage the mold sections.

* * * * *

UNITED STATES PATENT AND TRADEMARK OFFICE
CERTIFICATE OF CORRECTION

| | |
|---|---|
| PATENT NO. | : 7,001,171 B2 |
| APPLICATION NO. | : 09/788916 |
| DATED | : February 21, 2006 |
| INVENTOR(S) | : Starita |

It is certified that error appears in the above-identified patent and that said Letters Patent is hereby corrected as shown below:

Col. 15, Line 11, "apparatus including," should read --apparatus, comprising

Signed and Sealed this

Twenty-second Day of August, 2006

JON W. DUDAS
*Director of the United States Patent and Trademark Office*